(12) United States Patent
Stokes et al.

(10) Patent No.: US 7,941,382 B2
(45) Date of Patent: May 10, 2011

(54) METHOD OF CLASSIFYING AND ACTIVE LEARNING THAT RANKS ENTRIES BASED ON MULTIPLE SCORES, PRESENTS ENTRIES TO HUMAN ANALYSTS, AND DETECTS AND/OR PREVENTS MALICIOUS BEHAVIOR

(75) Inventors: Jack W. Stokes, North Bend, WA (US); John C. Platt, Bellevue, WA (US); Michael Shilman, Albany, CA (US); Joseph L. Kravis, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 11/871,587

(22) Filed: Oct. 12, 2007

(65) Prior Publication Data

US 2009/0099988 A1    Apr. 16, 2009

(51) Int. Cl.
*G06E 1/00* (2006.01)
(52) U.S. Cl. .......................................................... 706/20
(58) Field of Classification Search .................... 706/20; 726/3, 11, 13, 14–25; 713/188
See application file for complete search history.

(56) References Cited

U.S. PATENT DOCUMENTS

| | | | |
|---|---|---|---|
| 7,162,741 | B2 | 1/2007 | Eskin et al. |
| 7,181,768 | B1 | 2/2007 | Ghosh et al. |
| 2002/0066034 | A1* | 5/2002 | Schlossberg et al. ......... 713/201 |
| 2004/0039968 | A1 | 2/2004 | Hatonen et al. |
| 2004/0098617 | A1 | 5/2004 | Sekar |
| 2005/0160340 | A1 | 7/2005 | Abe et al. |
| 2006/0034305 | A1 | 2/2006 | Heimerdinger et al. |
| 2006/0037077 | A1 | 2/2006 | Gadde et al. |
| 2006/0095968 | A1 | 5/2006 | Portolani et al. |
| 2006/0191010 | A1 | 8/2006 | Benjamin |
| 2007/0074272 | A1 | 3/2007 | Watanabe |
| 2008/0022404 | A1* | 1/2008 | Holtmanns et al. ............ 726/23 |
| 2008/0117918 | A1* | 5/2008 | Kobayashi .................... 370/400 |
| 2008/0147574 | A1* | 6/2008 | Chidlovskii ................... 706/12 |
| 2009/0265784 | A1* | 10/2009 | Waizumi et al. ................ 726/23 |

OTHER PUBLICATIONS

Culotta et al., Corrective feedback and persistent learning for information extraction, 2006, Elsevier, pp. 1-22.*
Eskin, et al. "A Geometric Framework for Unsupervised Anomaly Detection: Detecting Intrusions in Unlabeled Data," http://www.cse.ucsd.edu/~eeskin/papers/uad-dmsa02.ps, last accessed May 16, 2007, 20 pages, New York, New York.

(Continued)

*Primary Examiner* — David R Vincent
(74) *Attorney, Agent, or Firm* — Lee & Hayes, PLLC

(57) ABSTRACT

A malicious behavior detection/prevention system, such as an intrusion detection system, is provided that uses active learning to classify entries into multiple classes. A single entry can correspond to either the occurrence of one or more events or the non-occurrence of one or more events. During a training phase, entries are automatically classified into one of multiple classes. After classifying the entry, a generated model for the determined class is utilized to determine how well an entry corresponds to the model. Ambiguous classifications along with entries that do not fit the model well for the determined class are selected for labeling by a human analyst. The selected entries are presented to a human analyst for labeling. These labels are used to further train the classifier and the models. During an evaluation phase, entries are automatically classified using the trained classifier and a policy associated with determined class is applied.

20 Claims, 20 Drawing Sheets

OTHER PUBLICATIONS

Lee, et al. "A Data Mining Framework for Building Intrusion Detection Models," http://thc.org/root/docs/intrusion_detection/nids/A-Data-Mining-Framework-for-Building-IDS.pdf, last accessed May 16, 2007, 13 pages, New York, New York.

Sekar, et al. "Specification-based Anomaly Detection: A New Approach for Detecting Network Intrusions," http://www.cs.virginia.edu/~aaa6j/test2_h0_i0_s0/p265-sekar.pdf, CCS '02, Nov. 18, 2002, 10 pages, Washington D.C., USA.

Bowring, et al. "Active Learning for Automatic Classification of Software Behavior," http://www.cc.gatech.edu/aristotle/Publications/Papers/p398-bowring.pdf, ISSTA '04, Jul. 11, 2004, 11 pages, Boston, Massachusetts.

\* cited by examiner

560

To: human@example.com
Re: Anomaly report for 8/1/XX 10:00 AM

Below are the anomalies for the last 15 minutes:

1023. UnknownAAA running on port 2033 at 192.168.1.123
1024. Remote access to port 25 on honeypot from 10.2.3.4
1025. Firewall blocked traffic received from 192.168.1.76

You can send labels in for these anomalies by replying to this message and including in the body the anomaly number and the label to assign to the entry

FIG. 5C

METHOD OF CLASSIFYING AND ACTIVE LEARNING THAT RANKS ENTRIES BASED ON MULTIPLE SCORES, PRESENTS ENTRIES TO HUMAN ANALYSTS, AND DETECTS AND/OR PREVENTS MALICIOUS BEHAVIOR

TECHNICAL FIELD

The subject disclosure relates to malicious behavior prevention/detection using active learning, such as active learning for malicious behavior detection within an intrusion detection system or fraud detection system.

BACKGROUND

New threats and scams are always being created by mischievous people. For example, new threats from malware (e.g., worms, viruses, and spyware) occur with increasing frequency. As a result, organizations must remain vigilant in identifying new threats and scams to prevent and deter malicious behavior. Such vigilance is not only wise to prevent theft or fraud, but can be legally (e.g., Sarbanes-Oxley in the United States) or contractually required in various contexts. In addition to new threats, organizations need to monitor for known threats including variation thereof. As a result, many large organizations employ one or more employees that act as a security analyst or a fraud analyst. Smaller organizations often cannot afford to employ these employees, but nonetheless need to prevent and/or detect these threats.

Security or fraud analysts, where employed, often analyze large amounts of data to identify suspicious behavior, or anomalies, within otherwise normal behavior. For example, network security analysts at large organizations are often responsible for reviewing potentially millions of new entries each day looking for potential malicious behavior on a computer network. In this scenario, an entry, for example, can correspond to a network computer accessing the network (e.g., corporate network, Internet) or accessing one or more internal servers. Malicious behavior on the network can include malware or the introduction of unauthorized computers on the network. If an anomaly corresponds with misuse or fraud, corrective action can be taken manually by the analyst or other personnel. Such corrective action can include temporarily disabling the computer, removing malware, and/or notifying law enforcement authorities.

In order to assist analysts with the task of analyzing such a large amount of data, computerized systems have been developed. These systems include intrusion detection systems and fraud detection systems. For example, some systems use rules to determine if an entry corresponds with normal activity. If not, an alert is sent to an analyst for further analysis. However, since any non-normal entry is sent to the analyst, there can still be an unmanageable number of entries to review. In addition, the dichotomy between normal and non-normal entries prevents prioritization based on the potential severity of the misuse or fraud. Furthermore, such systems can be hard to maintain with large numbers of rules.

Signature-based systems have also been created. These systems rely on signatures of malicious events to detect anomalies. While signature-based alerts can help identify such malicious behavior, they often miss new or very rare events since the default assumption (e.g., if there is no signature) is the behavior is normal. In addition, such systems can be hard to maintain with large number of signatures.

The above-described deficiencies of malicious behavior detection/prevention techniques are merely intended to provide an overview of some of the problems of today's detection techniques, and are not intended to be exhaustive. Other problems with the state of the art can become further apparent upon review of the description of various non-limiting embodiments of the invention that follows.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the disclosed subject matter in a simplified form as a prelude to the more detailed description of the various embodiments of the disclosed subject matter that follows.

Briefly stated, a malicious behavior detection/prevention system is provided that uses active learning to classify entries into multiple classes. A single entry can correspond to either the occurrence of one or more events and/or the non-occurrence of one or more events. During a training phase, entries are automatically classified into one of multiple classes using a multi-class classifier. After classifying the entry, a model for the determined class is utilized to determine how well an entry corresponds to the model. Ambiguous classifications along with entries that do not fit the model well for the determined class are selected for labeling by a human analyst. The selected entries are presented to a human analyst for labeling. These labels are used to further train the classifier and update the model for the labeled class.

After the training phase, an evaluation phase utilizes the trained multi-class classifier to classify entries and automatically perform a policy associated with that class of entries. The evaluation can occur in real-time or within a predetermined amount of time. The evaluation phase can be performed by a separate organization, such as when an expert human analyst initially trains the classifier and the trained classifier is distributed to small organizations for use in malicious behavior detection. Periodic updates to the classifier can be received similar to anti-virus signatures.

The malicious behavior detection/prevention system can be used in various manners and interact with other systems. For example, the malicious behavior detection/prevention system can be used as part of an intrusion detection system or a fraud detection system. Furthermore, the malicious behavior detection/prevention system can get some or all of the entries from other systems, such as a network activity logging system or a facility card access system.

The following description and the annexed drawings set forth in detail certain illustrative aspects of the disclosed subject matter. These aspects are indicative, however, of but a few of the various ways in which the principles of the innovation can be employed and the disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

The system and methods for malicious behavior detection/prevention that are facilitated by active learning are further described with reference to the accompanying drawings.

FIGS. 5A-5C are exemplary, non-limiting user interfaces presented to a security analyst for labeling.

DETAILED DESCRIPTION

Figure 1:
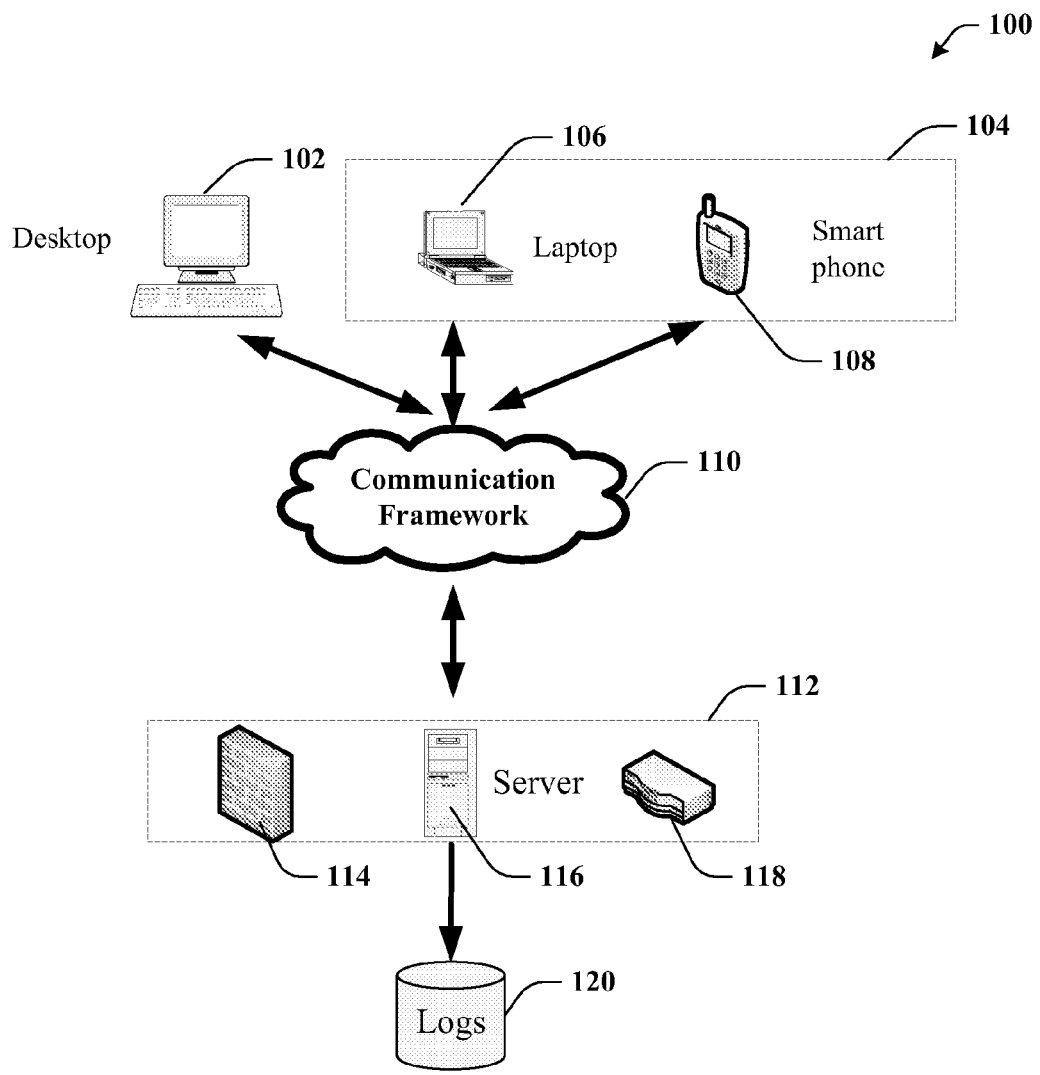
FIG. 1 is a block diagram representing an exemplary non-limiting networked environment in which a network-based intrusion detection system employs malicious behavior detection/prevention according to one embodiment.

Malicious behavior detection/prevention is facilitated by active learning. Entries corresponding to one or more actions, or lack thereof, can be received by the malicious behavior detection/prevention system. Such entries can be received from file-based logs, databases, or supplied via an application programming interface with external systems or calculated from values retrieved from those data sources. The malicious behavior detection/prevention technique can be used with large (e.g., hundreds of thousands) and very large number (e.g., millions) of entries.

During a training phase, each entry can be automatically classified into one or multiple categories (or initially into a category until multiple categories exist) using one or more classifiers. If the classification is ambiguous (e.g., as determined by a certainty score), the entry can be presented to a human analyst for manual classification. In addition to classifying an entry into one of the existing categories, the human analyst can also create a new category of entries. Once an entry is manually classified, the classifiers can be trained for better classification of entries in the future.

After the classification of at least some entries, a model is built for each of the categories. Those entries that do not match the model are determined to be anomalies, which are also presented to a human analyst for classification, as well as potential corrective action. In particular, since new threats are unlikely to fit a model for an existing category, new malicious entries are quickly found within the proverbial haystack of normal entries. The classification of anomalies from the human analyst can also be used to further train the model and/or the classifiers. In at least some embodiments, one or more categories can correspond to known malicious behavior. Entries in these categories can be presented to a human analyst for corrective action. Depending on the usage scenario, corrective action can include removing malware from a computer, contacting law enforcement or an internal security group, preventing a transaction from occurring, or disabling access.

Since active learning is used, the system can be trained with fewer manually classified entries and thus with less employee time. Furthermore, after the system has initially been actively trained, the system can quickly find new and unusual entries for further investigation by the human analyst. In addition, at that time, the human analyst can potentially control the number of entries presented for classification and as potential anomalies within each iteration of multiple entries.

After the training phase, an evaluation phase utilizes the trained multi-class classifier to classify entries and automatically perform a policy associated with that class of entries. The evaluation can occur in real-time or within a small predetermined amount of time (e.g., every 15 minutes, hour). The evaluation phase can be performed by a separate organization, such as when an expert human analyst initially trains the classifier and the trained classifier is distributed to small organizations for use in malicious behavior detection. Periodic updates to the classifier can be received similar to anti-virus signatures. In addition, the small organization can in some embodiments continue to train the system and/or set the appropriate policy corresponding to each class.

In at least some embodiments, some or all of the entries that were previously processed by the anomaly system are re-presented to the system. By representing the entries, the system can further improve its accuracy. For example, the system can improve the classification by placing at least some historical entries into one of the relatively new categories. However, such an operation can be computationally expensive and depending on the nature of usage scenario can be unnecessary for reasonable accuracy.

The malicious behavior detection/prevention can be used as part of various systems, such as a facility card access system, a fraud detection system, or an intrusion detection system. These systems can further be part of still bigger systems, such as an e-commerce or a payment processing system. When used as part of these systems, malicious behavior detection/prevention can complement existing security/fraud mechanisms or used as a substitute for the other security/fraud mechanisms within the system.

Referring initially to FIG. 1, an exemplary scenario 100 for a network intrusion system that employs malicious behavior detection/prevention is illustrated. In this illustrated scenario, various types of desktop computers 102 and portable computers 104 connect via a communication framework 110 to various remote resources 112. Portable computers, can include laptops 106, smart phones 108, cell phones, tablets, etc. The communication framework 110 can be a wired or wireless based network. However, the malicious behavior detection/prevention technique is agnostic to the nature of the communication framework 110 and the devices connected to it.

Remote resources 112 can include routers 118, remote servers 116, or firewalls 114. In this scenario, each access to, from, or via the remote resources is logged into logs 120 or alternatively indicated to the network intrusion system in real-time. The logs can be database-based or file-based. The malicious behavior detection/prevention system (not shown)

can use data from the logs 120 to create entries during the training phase and or evaluation during the evaluation phase.

Figure 2A:
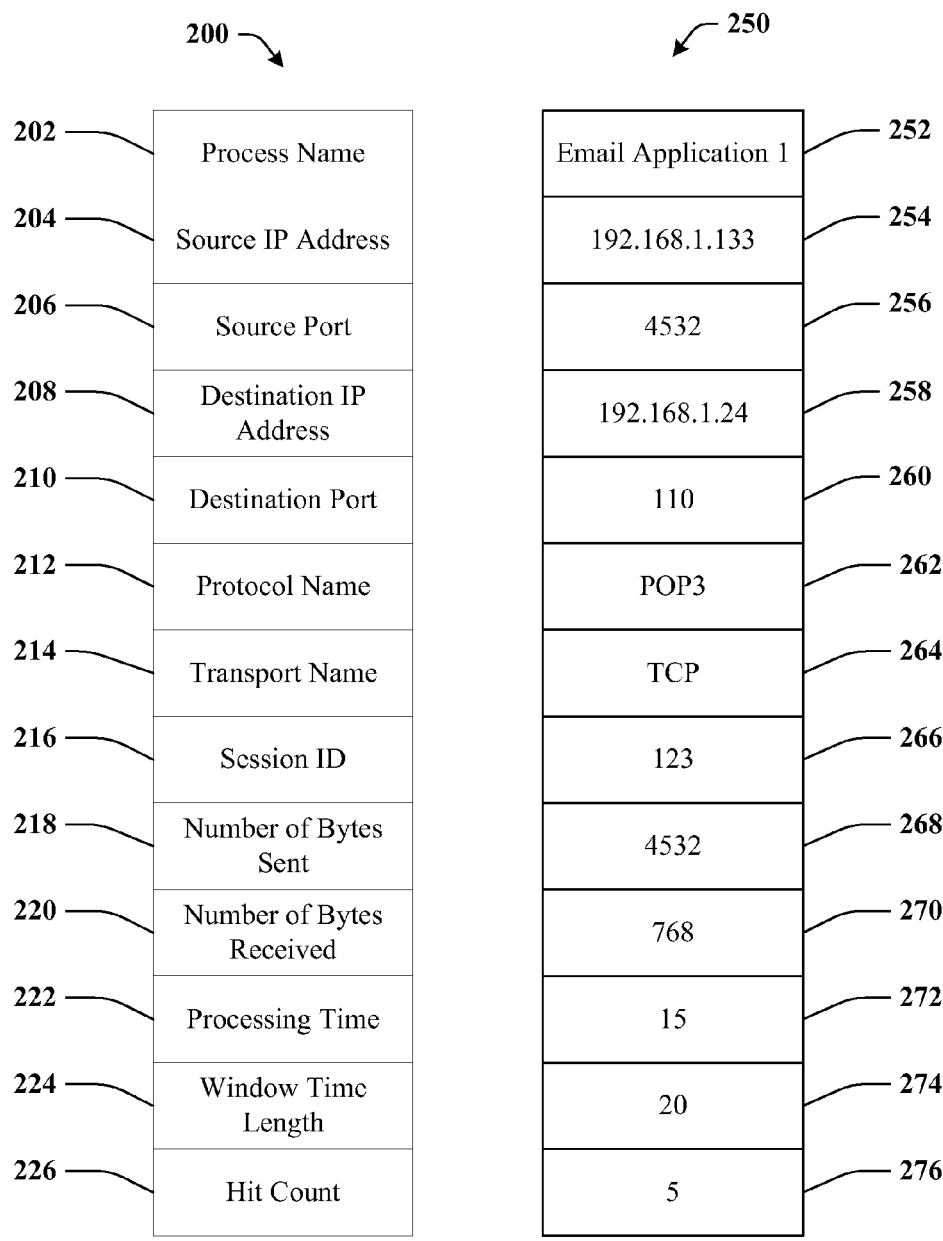
FIG. 2A illustrates an exemplary, non-limiting entry for a network-based intrusion detection system which employs malicious behavior detection/prevention according to one embodiment.

Referring to FIG. 2A, an exemplary entry corresponding to network access as described in FIG. 1 is illustrated. The illustrated entry has one of more of the following attributes: Process Name 202, Source IP Address 204, Source Port 206, Destination IP Address 208, Destination Port 210, Protocol Name 212, Transport Name 214, Session ID 216, Number of Bytes Sent 218, Number of Bytes Received 220, Processing Time 222, Window Time Length 224, and Hit Count 226. Attribute values for an exemplary entry are shown in 252, 254, 256, 258, 260, 262, 264, 266, 268, 270, 272, 274 and 276, respectively.

The attributes values can be retrieved and/or calculated from a database-based and/or file-based logs of network activity. In addition, one will appreciate that external data sources (e.g., a DNS server, database of application executables) can be queried for some or all of the attributes in some embodiments. While not shown, one will appreciate that one or more entries can be generated by the non-occurrence of an event. For example, if one or more computers normally send a heartbeat ping and no ping is made within a predetermined period of time, an entry can be generated to be processed by the malicious behavior detection/prevention system.

In order to reduce the redundancy of multiple actions with related features and also to get a more macro view, multiple logged actions can be advantageously aggregated to create a single entry. The aggregated entry can, depending on the usage scenario, indicate the number of times an action has been performed within a predetermined period of time. For example, in a network-based intrusion detection system employing the malicious behavior detection/prevention, the entry illustrated in FIG. 2A aggregates together actions to get a total number of bytes sent and received.

Figure 2B:
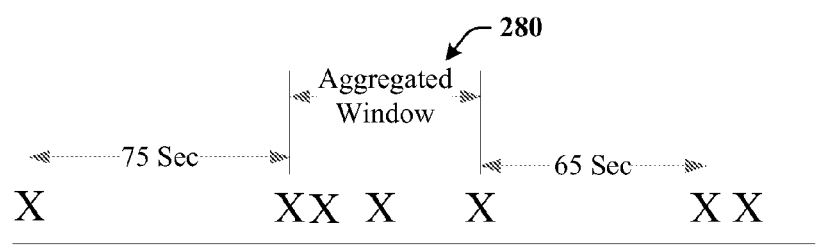
FIG. 2B is a schematic diagram illustrating how multiple actions can be aggregated together to form a single event entry according to one embodiment.

FIG. 2B illustrates the aggregation/clustering of similar actions. In this example, each "X" corresponds to network activity to/from a single computer to another computer. An aggregated window 280 is created in which the network activity is aggregated together. The window can be a static, such as a predetermined period of time (e.g., 30 seconds) or a single login, or advantageously can be determined dynamically. Dynamically determined windows can be bound to a predetermined amount of time (e.g., 60 seconds) in some embodiments. Dynamic window periods can capture related activities that may not fall within a predetermined period of time. However, additional processing needs to be performed to determine dynamic windows and it can slow the response to malicious behavior.

In the example, the window is dynamically determined by aggregating together network activity. Since the "X" on the left and the two "X"s on the right exceed a predetermined period (e.g., 60 seconds), those activities are not aggregated together. Advantageously, this dynamic windowing can for example, capture some or all of the network activity corresponding to a single macro request. For example, if activity corresponds to a request for a web page and its related resources, it is likely that the page and the related resources are all downloaded within a small window of time and that other requests to the web server are for different pages.

One will appreciate that the illustrated entry is exemplary. For example, more of less attributes can be used in a single entry. One will appreciate that in some embodiments the malicious behavior detection/prevention technique can be employed on entries of the same basic type or multiple types. For example, in a network-based intrusion detection system, one type of entry can correspond to traffic being transmitted while another entry corresponds to data received. Each type of entry can be processed with different sets of classes or processed within a single set of classes with multiple models corresponding to each type of entry per class.

Figure 3A:
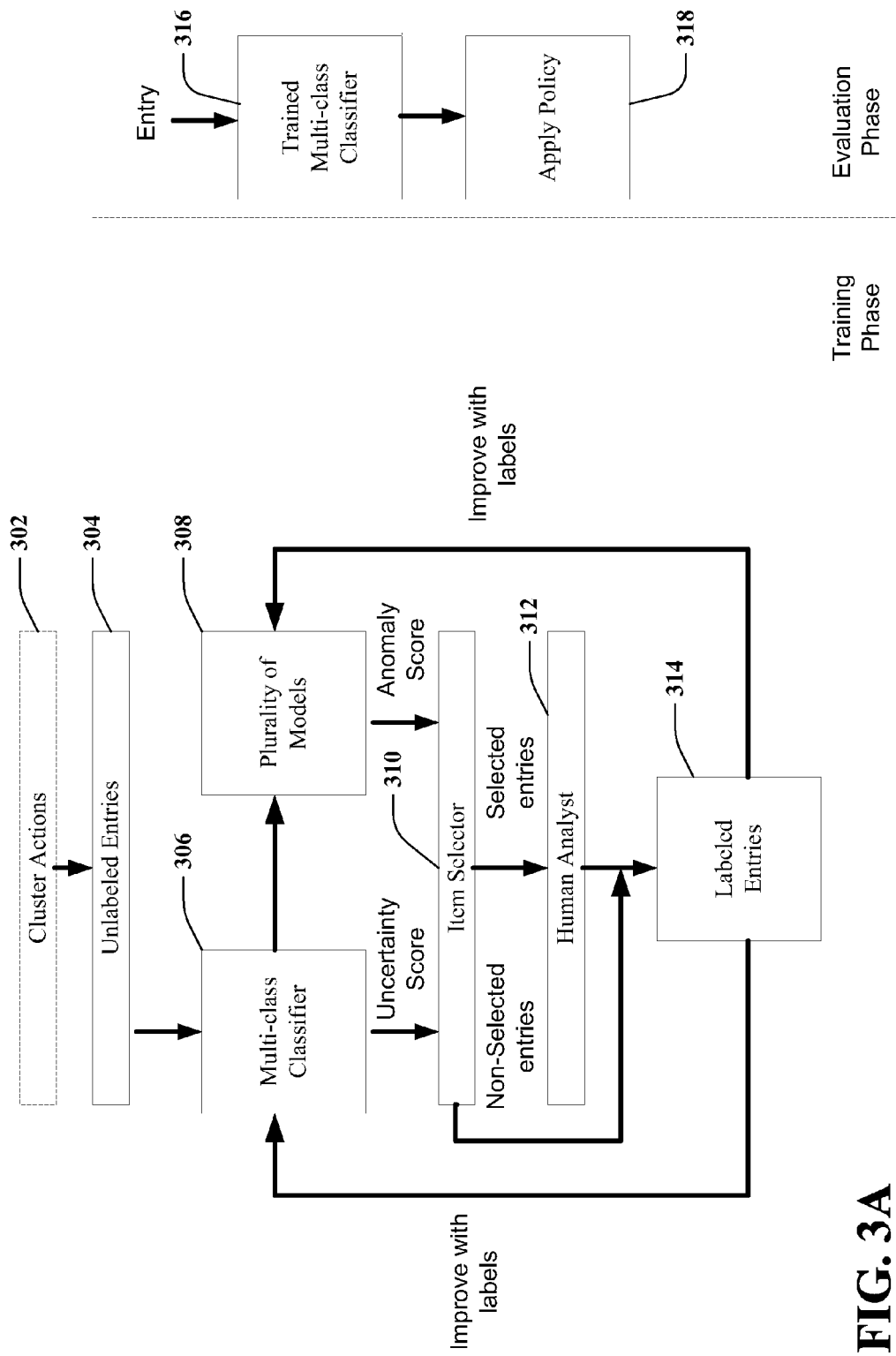
FIGS. 3A-3B illustrate exemplary data flow in a malicious behavior detection/prevention system.

The data flow for a malicious behavior detection/prevention technique according to one embodiment is shown in FIG. 3A. Actions can be clustered in 302 to create unlabeled entries 304 although in other embodiments actions are not clustered. Initially with no labeled items in the training phase, the technique can propose random items for the analyst to label. If one or more of the items belong to a new class, the human analyst can create a new class for the item when labeling the item. After the analyst labels one or more items, the technique trains a multi-class classifier 306 using the labeled items 314. The multi-class classifier can be any one of a number of discriminative classifiers including logistic regression or a support vector machine (SVM). Once parameters for the classifier have been learned, the technique uses the multi-class classifier 306 to predict the labels for the unlabeled items by automatically classifying them.

After an entry is classified, a generative model 308 for each class is determined/updated using the true labels from the labeled items and the predicted labels from the unlabeled items. The purpose of constructing a generative model is to predict the log likelihood of non-manually labeled entries with respect to matching the class model. The log likelihood acts as an anomaly score based on how well an item matches the class. If an entry is selected by the item selector 310, the entry is presented to a human analyst to label. Entries can be selected by the item selector 310 based on an uncertainty score with respect to classification or an anomaly score. Selected entries are presented to a human analyst 312 to manually label.

Manually labeled items from the human analyst are then used to train the classifiers 306 and the models 308. The classifier can also be trained based on the predicted labels in some embodiments.

In the evaluation phase, entries are clustered in the same manner, if any, as in the training phase. The entry is classified using the trained multi-class classifiers 316 produced in the training phase (i.e. multi-class classifier 306). The entry can be classified in real-time (e.g., after the last action within the window occurs) or can be classified in batch-mode at some later time. Once the entry is classified, a policy 318 associated with the determined class is applied. The policy can, for example, make corrective actions immediately or generate alerts to appropriate personnel. One or more classes can have a policy of doing nothing, such as for classes of normal behavior. When the trained classifier is distributed to disparate organizations from the organization that trained the classifier, the policy can be set by the disparate organization or the policy for some or all of the classes can be preset by an organization distributing the trained classifier.

Figure 3B:
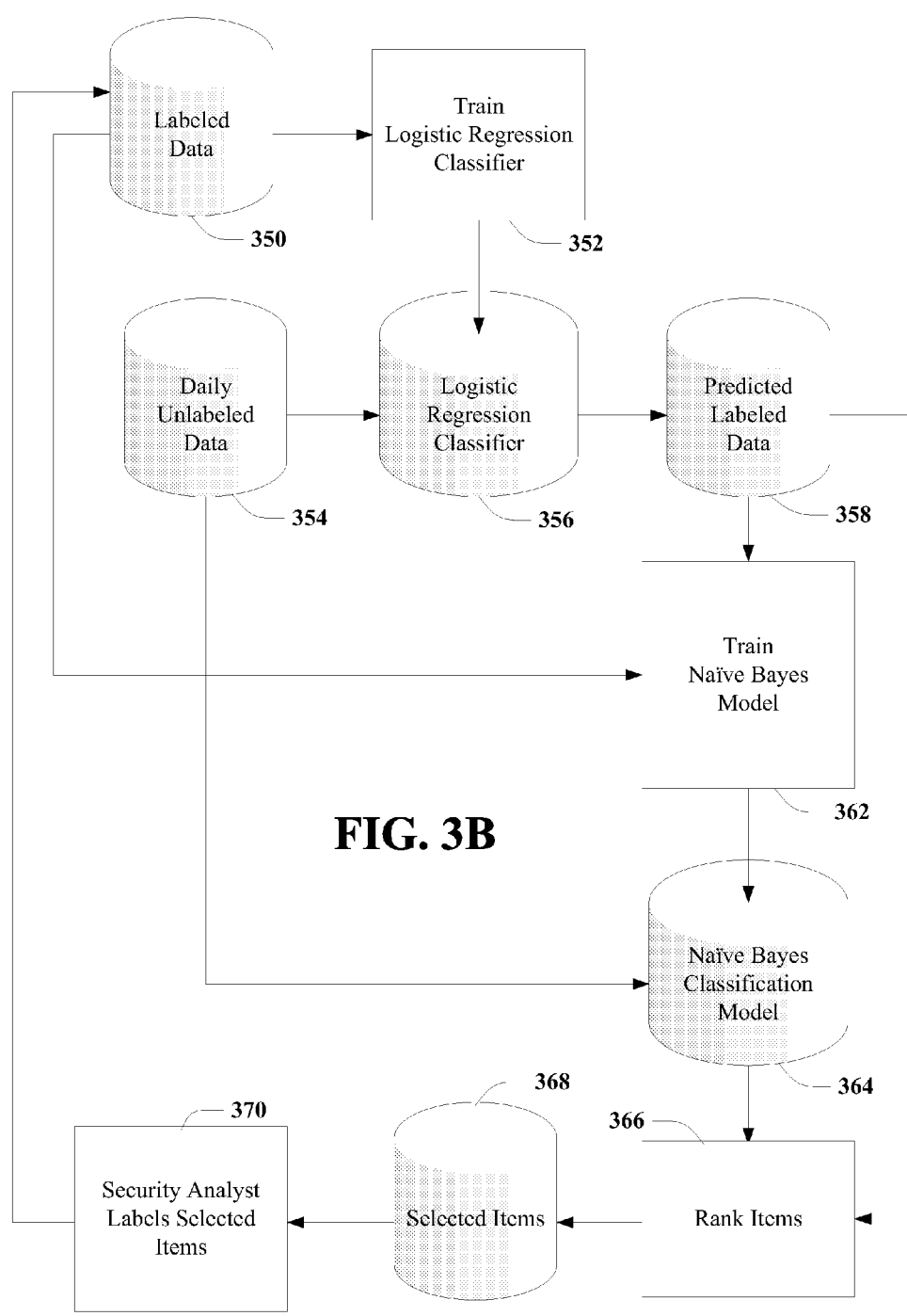

A more detailed view of the data flow during the training phase according to one embodiment is shown in FIG. 3B. Labeled data 350 is used to train a logistic regression classifier 352, which is stored as a logistic regression classifier 356. Labeled data can include items that were classified by a human analyst and in some embodiments items that were previously automatically classified by other systems (e.g., classifiers other than the logistic regression classifier 352). For example, a firewall system can classify an event as belonging to a particular class of traffic and indicate that it blocked the traffic. The class label from the firewall can act as a feature which is used to train the logistic regression classifier. Daily unlabeled data 354 is classified using the logistic regression classifier 356 to create predicted labeled items.

One will appreciate that in other embodiments, the unlabeled data can be for different periods of time or unlabeled data can be all unlabeled data since the last time a training was performed.

Uncertain items from the automatic classification, can be determined, for example, by calculating an uncertainty score that measures how certain the automatic classifier is in the predicted classification. In particular, this equation can be used to calculate uncertain items:

$$\min_{i,j \neq i} |P(i|x_n) - P(j|x_n)|$$

$$\text{while } i = \operatorname{argmax}_k (P(k|x_n)).$$

where $x_n$ is an input vector representing an item and i, j, and k are classes.

Both labeled data and predicted labeled data can be used to train a naïve Bayes model (362) for each class, which produces multiple naïve Bayes models 364. Subsequently, the naïve Bayes model 364 is used with the daily unlabeled data 354 to produce a log likelihood score of how well an item matches the class's model. The items then can be ranked (366) according to the log likelihood score and/or the uncertainty score. Based on the rank, items are selected to be presented to the security analyst. Selected items 368 are presented to a security analyst for labeling and, if appropriate, potential corrective action at 370.

The behavior of the technique for anomaly detection is illustrated in FIGS. 4A through 4D. Unlabeled entries are shown by an asterisk (*) and labeled entries are shown by a plus (+). Initially, all the entries are unlabeled in this example. Such a condition can exist, for example, when the malicious behavior detection/prevention is used for the first time or when a user decided to retrain the system from scratch (e.g., after a major change in the organization, such as department reorganization, deployment of new software applications, or a merger/acquisition).

Figure 4A:
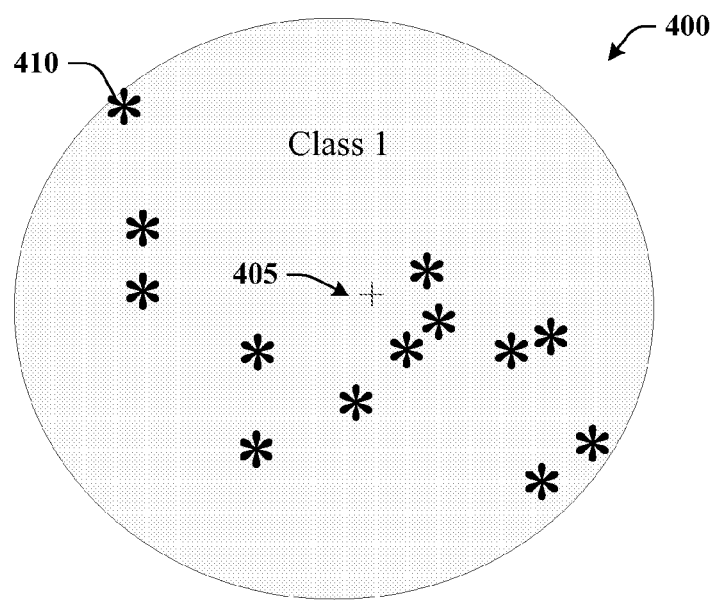
FIGS. 4A-4D illustrate active learning in classifying entries into multiple categories.
Figure 4B:
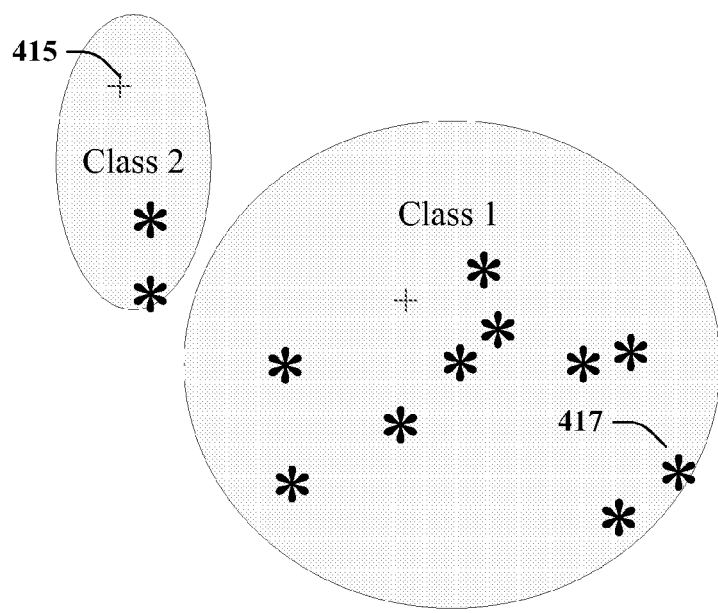
Figure 4C:
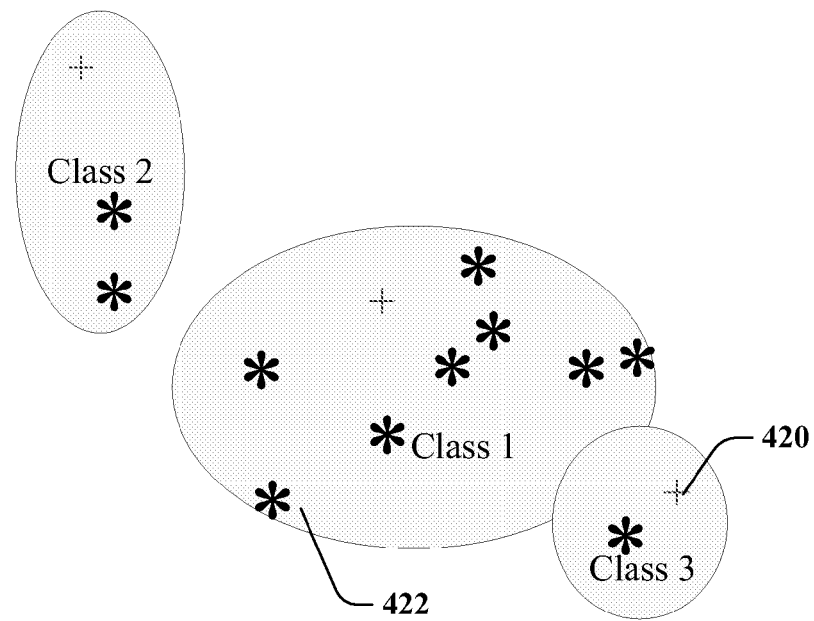
Figure 4D:
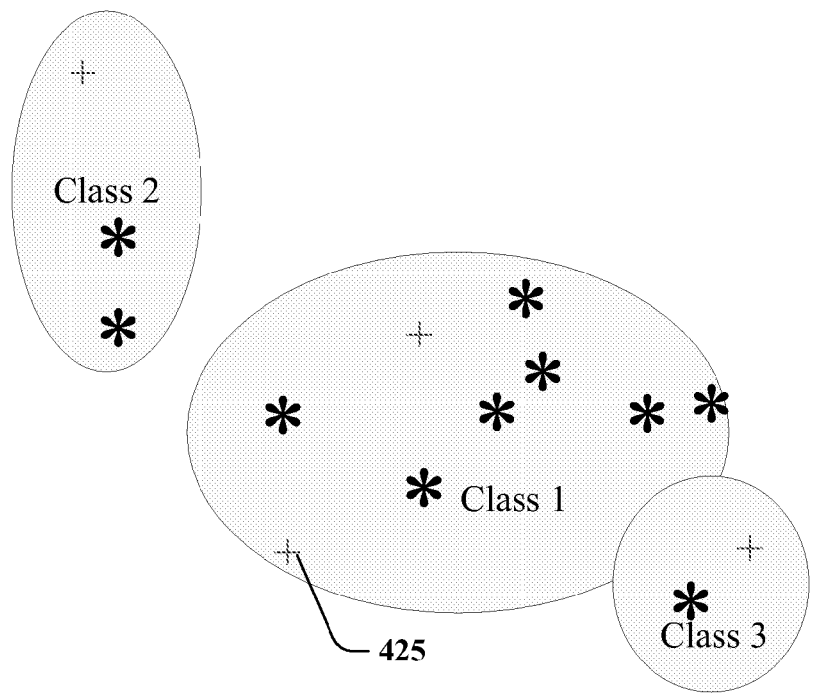

In FIG. 4A, the analyst labels the entry 405 in the middle of the diagram with the label "Class 1" 400. Next, the technique prompts the analyst to label the most anomalous entry 410 belonging to the "Class 1" model. The corresponding labeled entry 415 is shown in FIG. 4B. The analyst decides this new point belongs to a new class, which she names as "Class 2". This causes two new models to be generated, one for "Class 1" and one for "Class 2." Next, the technique prompts the analyst to label the most anomalous item 417. In FIG. 4C, a third class ("Class 3") is generated based on the new labeled item 420. Next, the technique prompts the analyst to label the most anomalous item 422. Then, in FIG. 4D, since the analyst decides the new labeled entry 425 belongs to "Class 1," a new class is not generated. In addition, the technique can prompt the analyst to label one or more anomalous items from each class for each iteration of the technique. Similarly, the technique can prompt the analyst to label one or more uncertain items which lie close to the boundary between two adjacent classes (not shown).

Although, for the sake of brevity and clarity, large number of classes are not illustrated, one will appreciate that such a number of classes can be employed in one embodiment. One will also appreciate that in at least some embodiments, the system can be initially seeded with multiple classes using entries that correspond with various types of behavior. Advantageously, if such seeded classes are provided, the amount of entries that need to be classified initially to effectively find anomalies is lowered. However, this has the disadvantage that the classes and the entries in those classes are not customized to the exact usage of an organization.

Figure 5A:
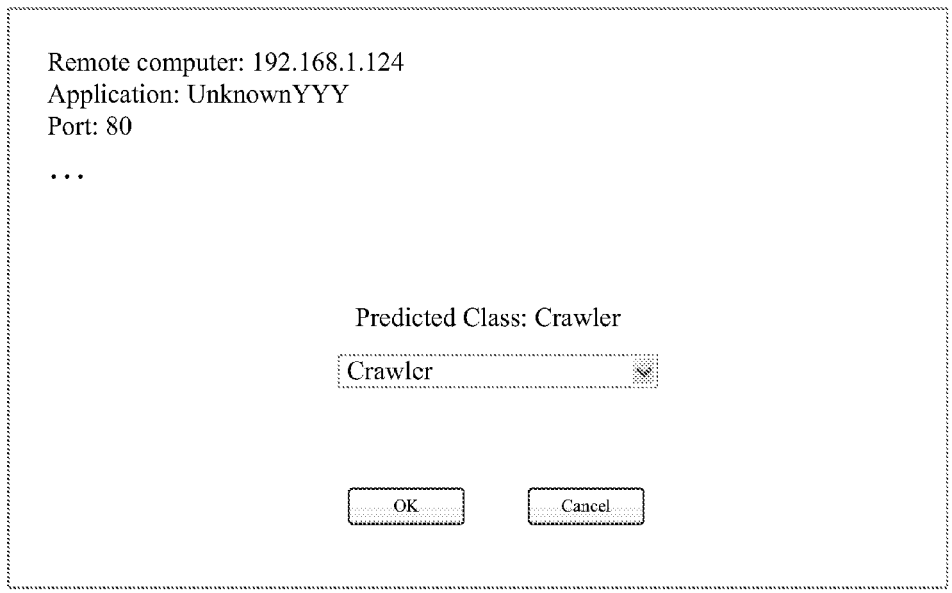
Figure 5B:
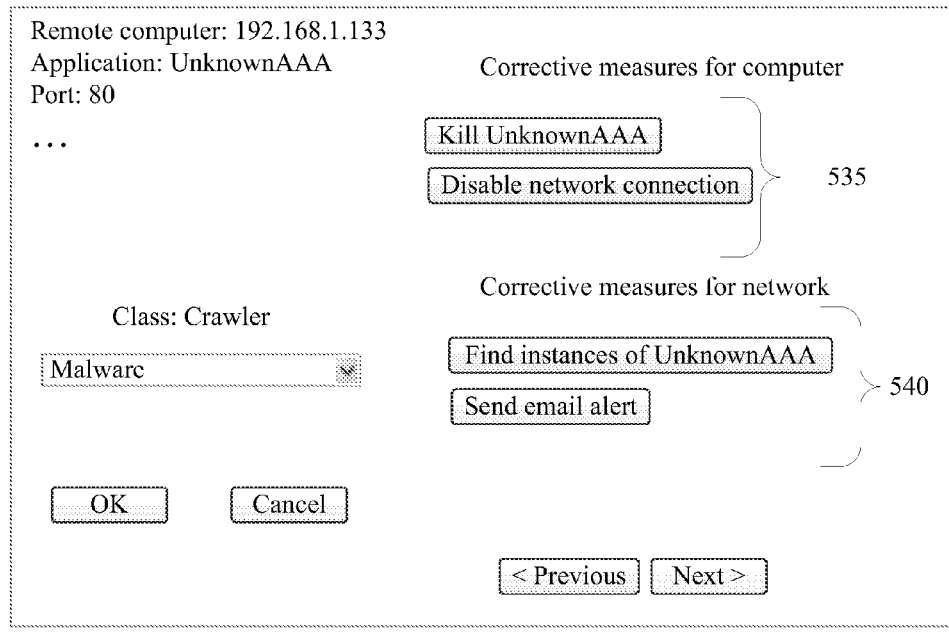

FIGS. 5A-5C illustrate example user interfaces to present an entry to a human analyst for labeling. In particular, FIG. 5A illustrates an example user interface 500 for labeling ambiguous entries. In this example user interface, various details about the entry are presented to the user and a drop-down control is used to select the class. The security analyst is aided by the ambiguous classification given by the automated multi-class classifier and for convenience this is the default in the drop-down control. One will appreciate that other types of controls can be utilized. Furthermore, one will appreciate that controls (not shown) can be present to create a new class in which to classify the entry. Upon creating a new class, various metadata (e.g., policy to apply) about the class can be supplied as well.

FIG. 5B illustrates an example user interface 530 for labeling a detected anomaly as well as taking various corrective actions during the training phase. The user interface presents the entry and also supplies a drop-down for labeling. However additional controls (535, 540) are available for taking corrective actions. The nature of the corrective actions depends on the usage scenario. In this illustration, the corrective actions can be performed on a particular computing device or network-wide.

Although not shown, one will appreciate that other user interfaces can be presented. For example, a list of entries in a particular class can be displayed. Advantageously, if a class corresponds to malicious behavior, a human analyst can use this user interface to facilitate manual corrective action (e.g., during the training phase when an associated policy is not automatically applied).

In some embodiments, single user interface is presented for labeling both potential anomalies and ambiguous entries. For example, a user interface can comprise a grid control with at least entries selected for labeling. A human analyst can enter the class directly into the grid control. One will appreciate that although a graphical user interface is illustrated for FIGS. 5A and 5B, the subject disclosure contemplates various modalities in presenting an entry and receiving a label in various embodiments. For example, text-to-speech could be used to read an entry to a human analyst and speech recognition used to receive an indication of the label. In addition, various manners of text-based messaging can be used to present an entry to the human and subsequently receive a label. For example, FIG. 5C illustrates an email with an anomaly report. Various anomalies are listed to a security analyst and a security analyst can reply with labels adjacent to entry numbers in this embodiment to label the potential anomalies One will appreciate that other types of intrusion detection systems can be implemented using the malicious behavior detection/prevention technique. FIGS. 6A-6E illustrate exemplary scenarios in which other types of intrusion detection systems are used and example entries for each type of intrusion detection system. However, one will appreciate that additional scenarios and types are possible in other embodiments.

Figure 6A:
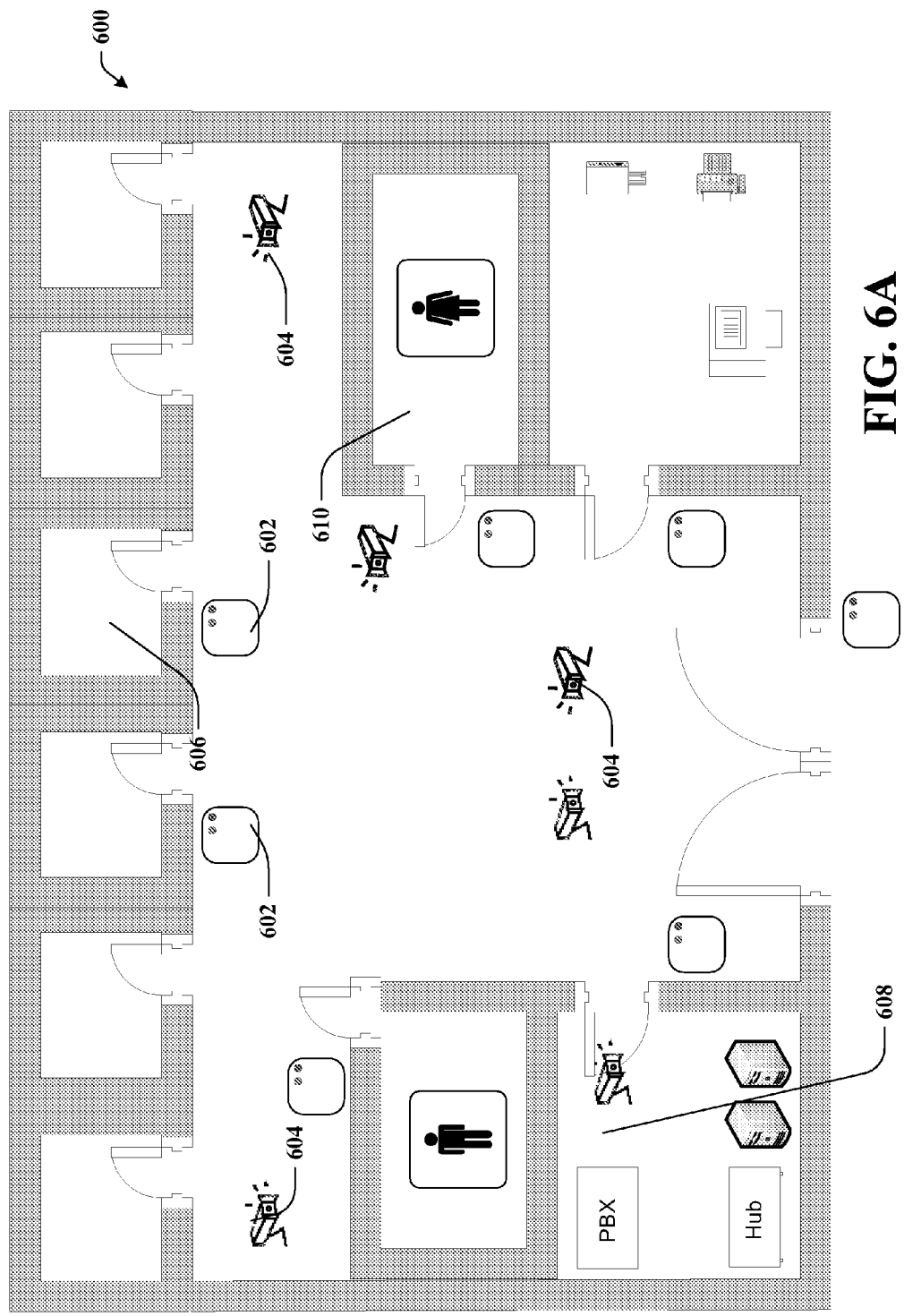
FIGS. 6A-6E illustrate exemplary scenarios for alternative types of intrusion detection systems that employ malicious behavior detection/prevention and exemplary entries for each type of intrusion detection system.

Referring to FIG. 6A, a portion of a building 600, such as an office building, is illustrated. One will appreciate that although only a portion of a building is illustrated for the sake of brevity. The building has multiple electronic card reading locks 602 on various doors. These locks are connected to a facility card access system that controls access to various parts of the facility and logs each successful and unsuccessful attempt to access an area. Each authorized person has a unique card that grants the person access to areas they are authorized to access. The illustrated areas include an office 606, the women's room 610, and a network closet 608. In addition, the illustrated facility has a number of cameras 604 scattered throughout the facility. The cameras can record a person as the person is attempting access to an area using an access card.

Figure 6B:
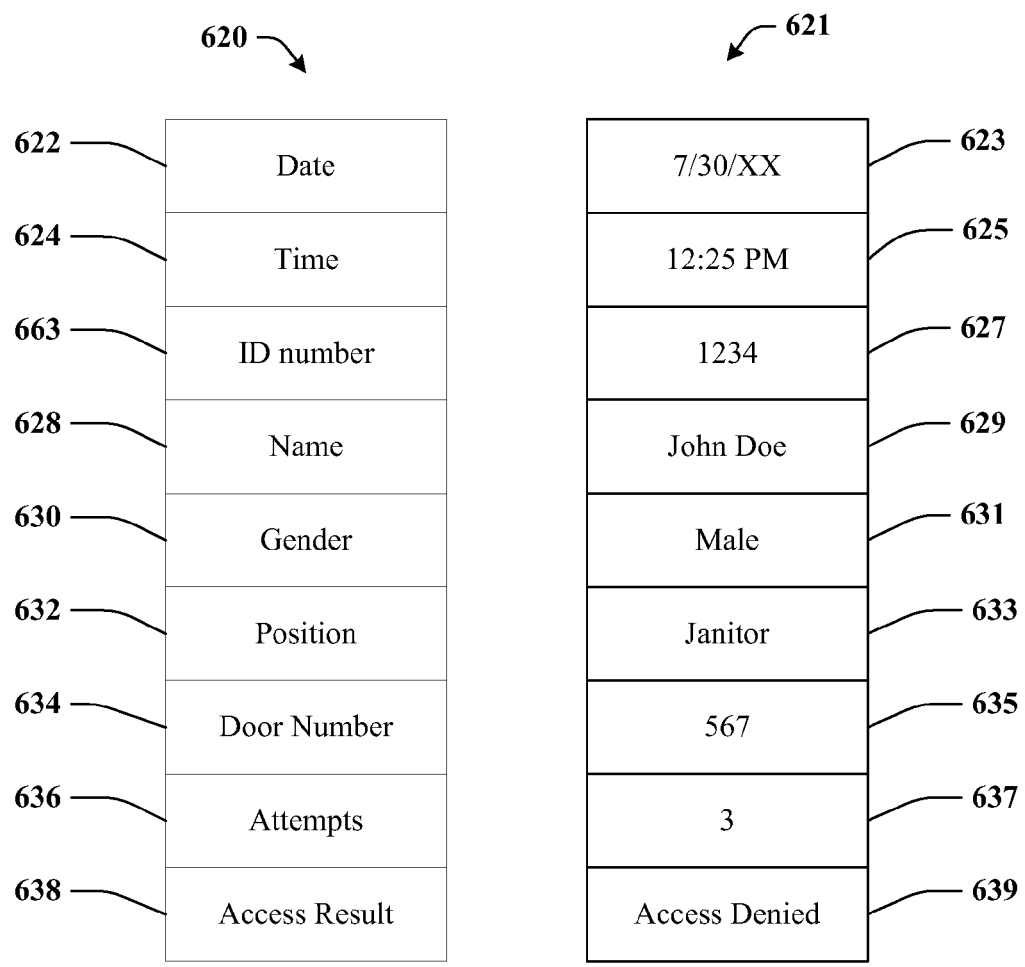

FIG. 6B is an exemplary entry for a building-based intrusion detection system that operates in the exemplary environment discussed with respect to FIG. 6A. One will also appreciate that some or all of the data illustrated in the entry can be retrieved or inferred from records in multiple database tables, such as data from the facility card access system and/or other system of an organization.

Column 620 illustrates a description of various attributes in the illustrated entry while column 621 illustrates human-readable values for the attributes. One will appreciate that some of the attributes can be stored/manipulated in other manners, such as via the use of database keys or a number (e.g., for discrete attributes). It will be understood that one or more attributes can be optional. Furthermore, one will also appreciate that the attributes are exemplary and more or less attributes can be used in other embodiments.

In this illustrated the example, the attributes are: date 622, time 624, ID number 626, name 628, gender 630, position 632, door number 634, attempts 636, and access result 638. The attribute values for these attributes are shown in 623, 625, 627, 629, 631, 633, 635, 637, and 639, respectively.

Figure 6C:
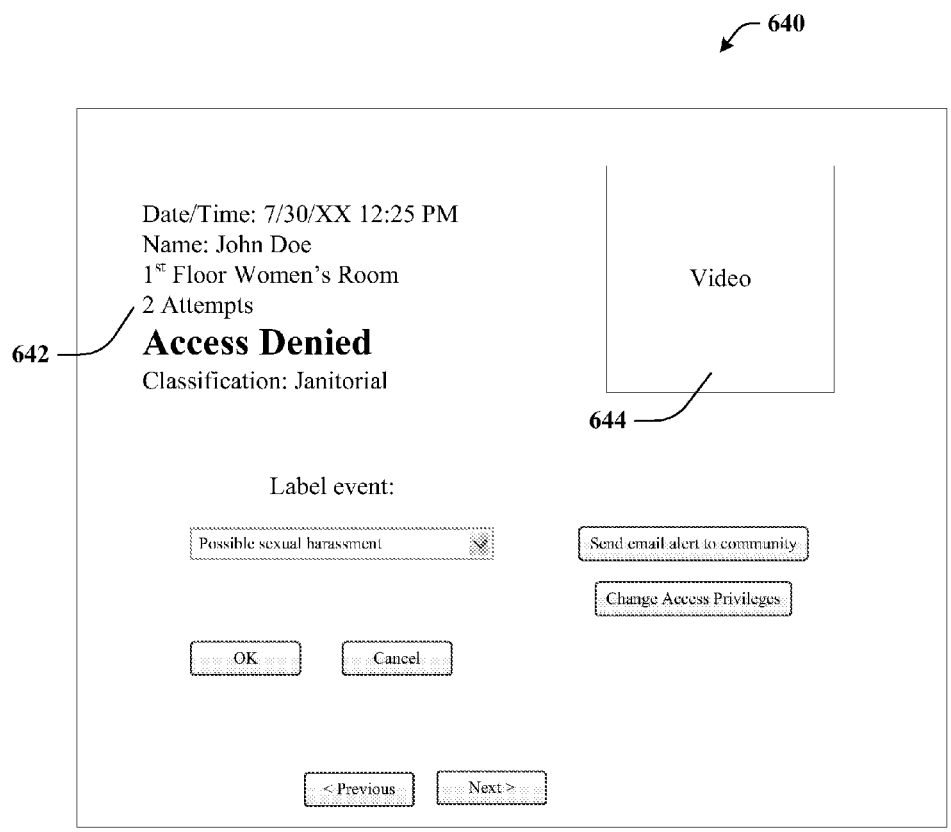

FIG. 6C illustrates an exemplary user interface 640 for a building-based intrusion detection system that employs the malicious behavior detection/prevention techniques. The user interface displays details about an entry. In this case, a male janitor tried to access the women's room in the middle of the day, when the male janitor is not authorized to access the women's room. As a result, this is anomalous behavior for a janitorial classification. The detected anomaly is presented to a security analyst for labeling and possible corrective action. External information, such as the video from the cameras or a picture (not shown) of the janitor from his access card, can also be presented in the user interface. Various actions can also be taken from the user interface as well.

Figure 6D:
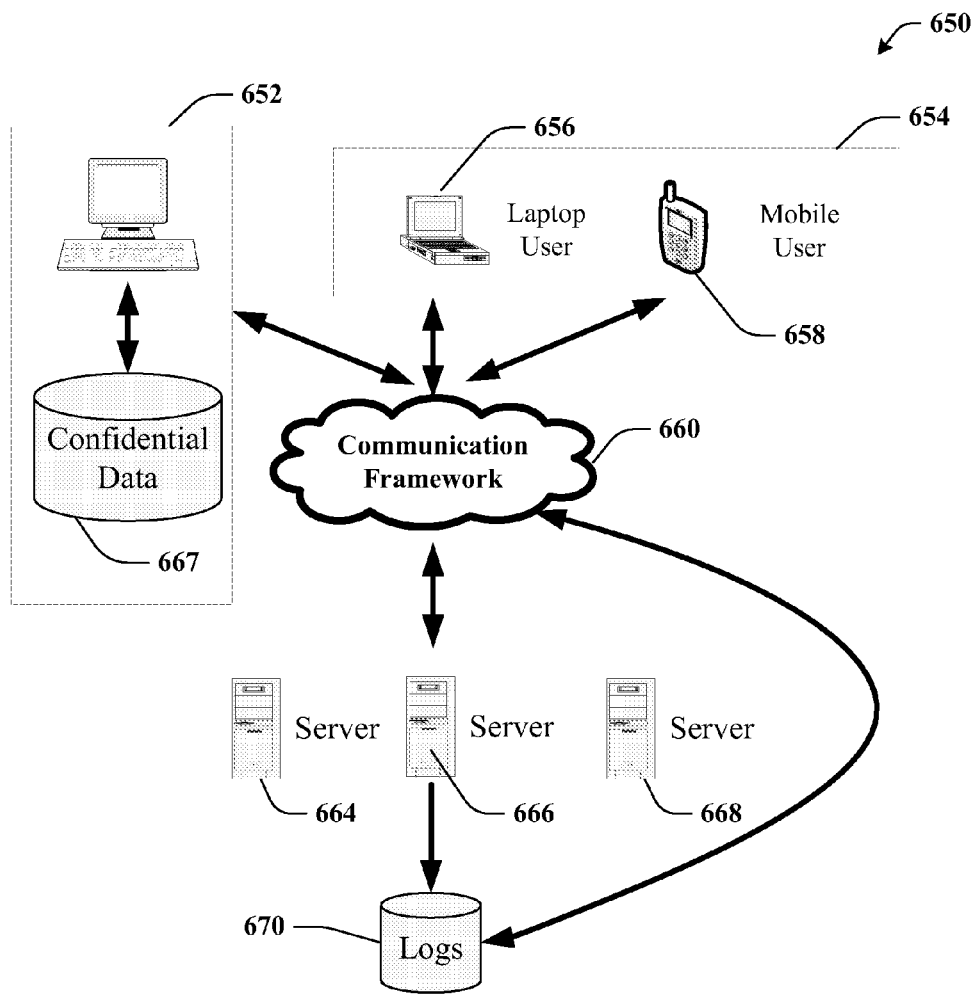

FIG. 6D illustrates yet another usage scenario in which the malicious behavior detection/prevention can be employed. In this scenario, data is recorded in logs for use in a host-based intrusion detection system. Access to confidential data is logged into logs 670. Typically, the confidential data is secured by a username/password or other type of user authentication, which advantageously assists in classifying activities and determining anomalous behaviors. In particular, desktop users 652 and portable users 654 (e.g., laptop users 656 and mobile users 658) are connected via a communication framework 660 to various servers (664-668), which have confidential data. In addition, in this illustrated scenario, the desktop 652 also has a local data store of confidential data 667, which is remotely logged in the logs 670 as well.

Figure 6E:
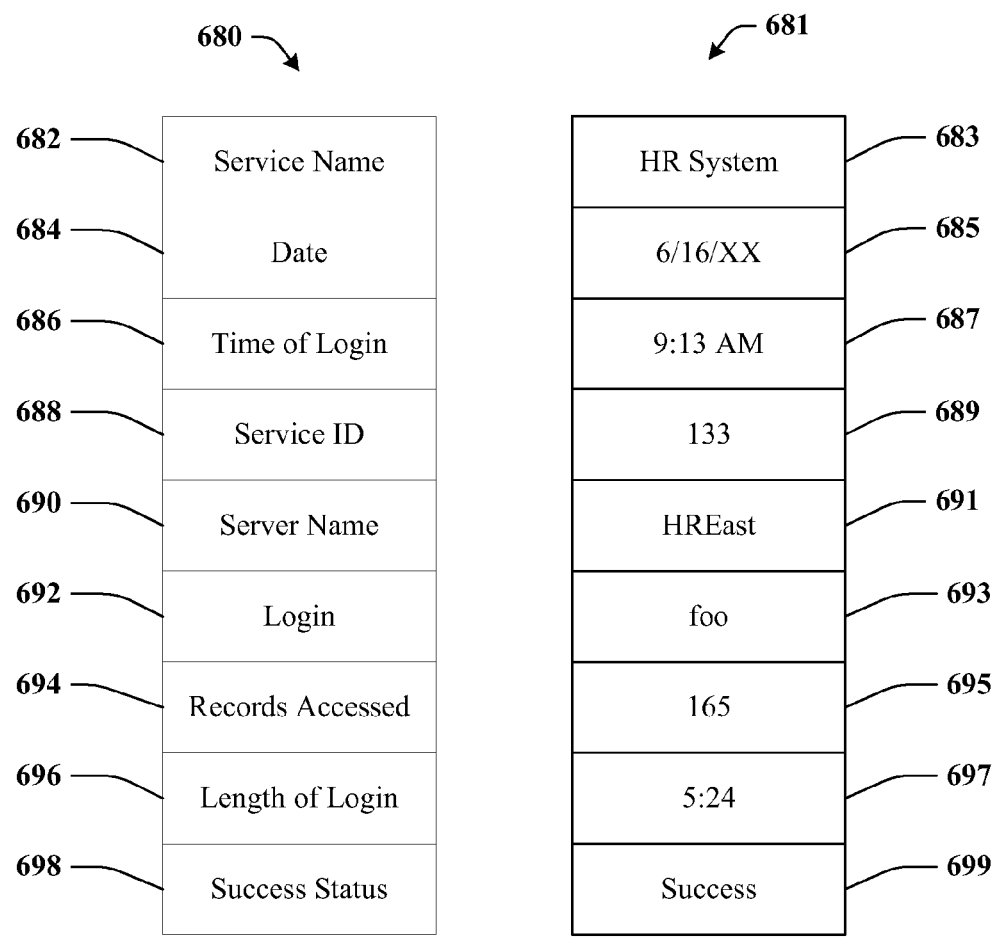

Referring to FIG. 6E, an exemplary entry for a host-based intrusion detection system is illustrated. One will also appreciate that some or all of the data illustrated in the entry can be retrieved or inferred from records in multiple logs and/or database tables.

Column 680 illustrates a description of various attributes in the illustrated entry while column 681 illustrates human-readable values for those attributes. One will appreciate that some of the attributes can be stored/manipulated in other manners, such as via the use of database keys or a number (e.g., for discrete attributes). It will be understood that one or more attributes can be optional. Furthermore, one will also appreciate that the attributes are exemplary and more or less attributes can be used in other embodiments.

In this illustrated the example, the attributes are: service name 682, date 684, time of login 686, service ID 688, server name 690, login 692, records accessed 694, length of login 696, and success status 698. The attribute values for these attributes are shown in 683, 685, 687, 689, 691, 693, 695, 697, and 699, respectively. As illustrated, the illustrated entry combines various actions taken by the user within a given login session. For example, one part of the illustrated entry contains the length of time the user was logged in 696, if any.

Figure 7A:
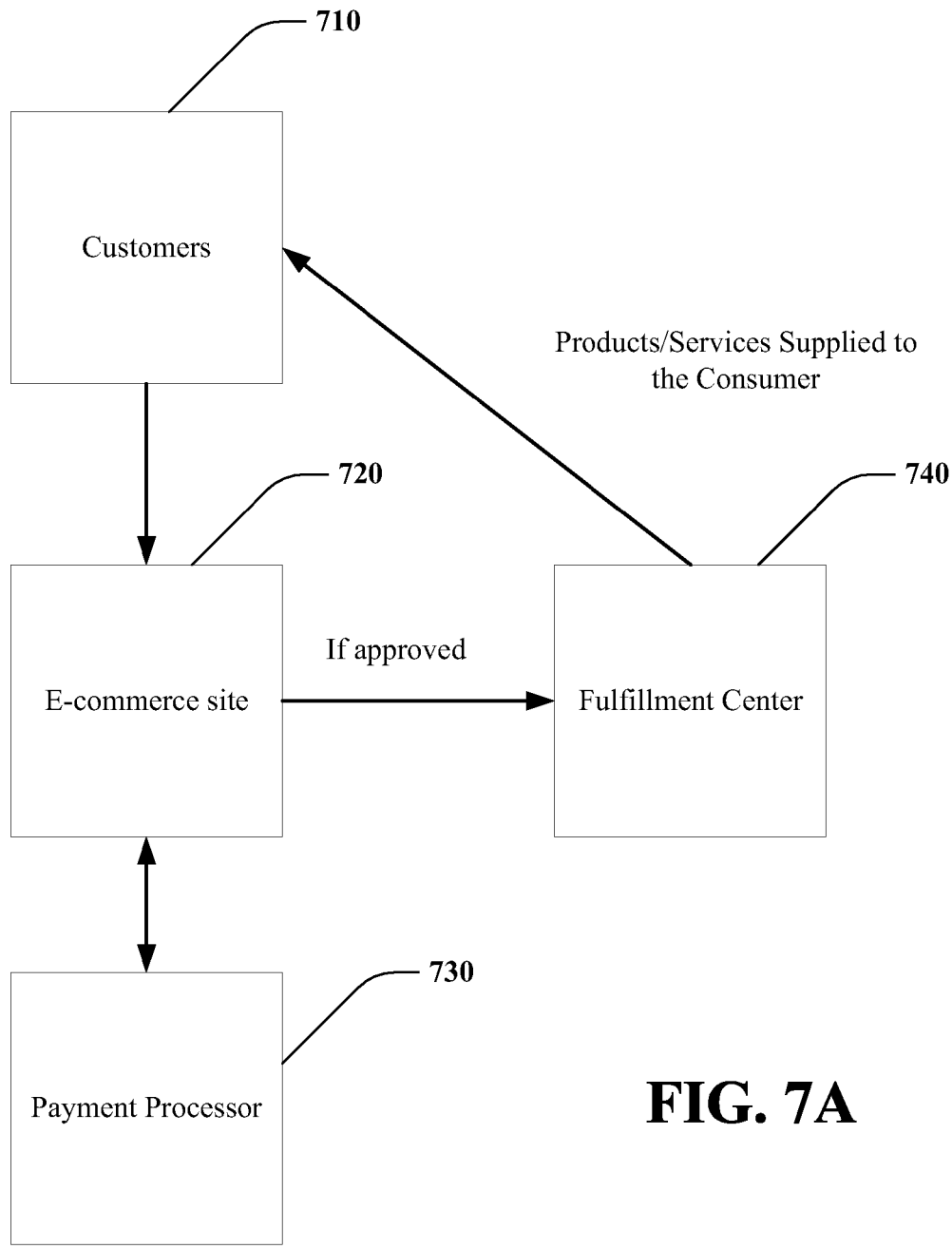
FIGS. 7A-7B illustrates an exemplary scenario for a fraud detection system and an exemplary entry for a fraud detection system that employs malicious behavior detection/prevention according to one embodiment.

Other systems can employ the active learning malicious behavior detection/prevention techniques. For example, the techniques can be employed as part of a fraud detection system. FIG. 7A illustrates an exemplary scenario where such a fraud detection system can be used. In particular, FIG. 7A illustrates a customer ordering from an e-commerce site. Customer 710 order products or services from an e-commerce site 720. The e-commerce site 720 interacts with the payment processor 730, such as a credit card processor, to get payment approval. If payment is approved, the customer's order is sent to a fulfillment center so that the product or service is supplied to the customer.

Unfortunately for the e-commerce site, since a payment instrument (e.g., credit card or debit card) is not physically present for the transaction, the e-commerce site bears the risk of loss in the event that the transaction is fraudulent. For example, if a stolen credit card is used, the e-commerce site will not be paid for the merchandise even if the credit card was approved. As a result, e-commerce sites typically employ fraud detection system to determine whether a given transaction is likely fraudulent before fulfilling the order. The malicious behavior detection/prevention techniques can be used as part of the fraud detection system to help detect the potentially fraudulent transactions.

In this scenario, event classes are created for different types of transactions or different types of goods or services. Some classes, such as classes under a certain dollar amount or those transactions from long-standing business customers may not be analyzed at all.

Figure 7B:
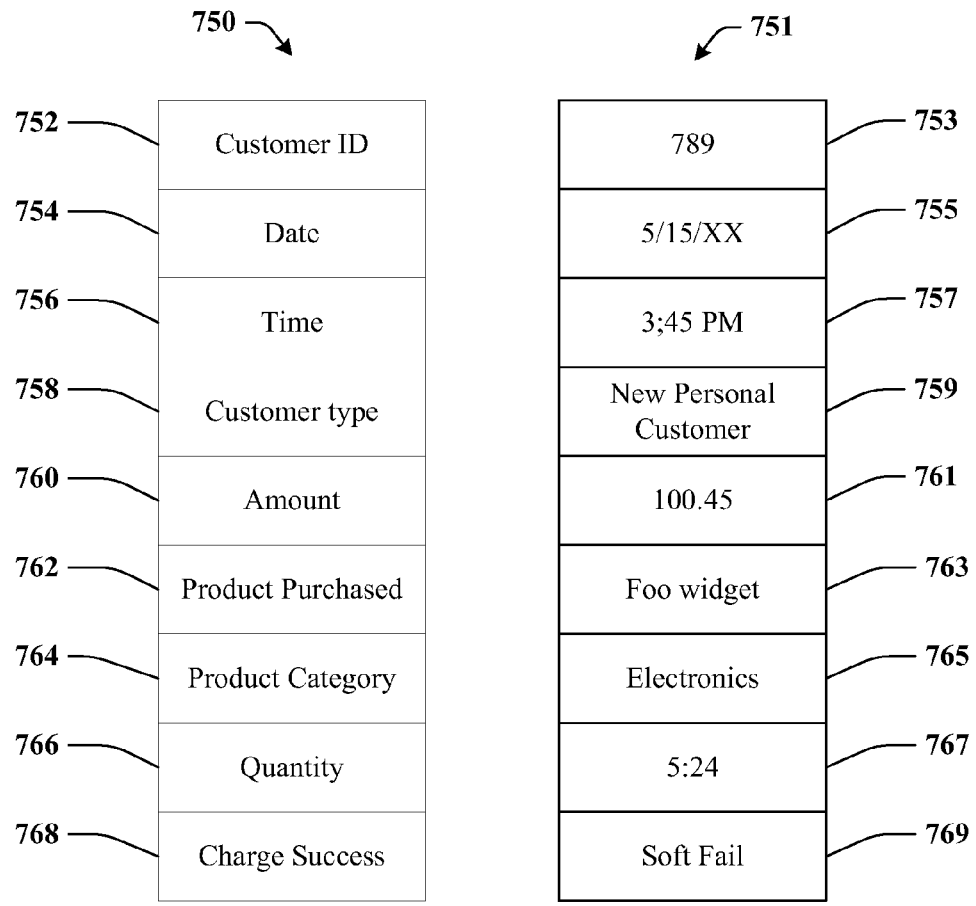

Referring to FIG. 7B, an exemplary entry for a fraud detection system is illustrated. For the sake of clarity, the illustrated entry depicts only a single product being bought. However, one will appreciate that an entry can contain any number of products being purchased in a single transaction or all transactions by that customer in a predetermined period of time (e.g., a day). One will also appreciate that some or all of the data illustrated in the entry can be retrieved or inferred from records in multiple database tables.

Column 750 illustrates a description of various attributes in the illustrated entry while column 751 illustrates human-readable values for the attributes. One will appreciate that some of the attributes can be stored/manipulated in other manners, such as via the use of database keys or a number (e.g., for discrete attributes). It will be understood that one or more attributes can be optional. Furthermore, one will also appreciate that the attributes are exemplary and more or less attributes can be used in other embodiments.

In this illustrated the example, the attributes are: customer ID 752, date 754, time 756, customer type 758, amount of the transaction 760, product purchased 762, product category 764, quantity 766, and charge success 768. Attribute values for these attributes in an exemplary entry are shown in 753, 755, 757, 759, 761, 763, 765, 767, and 769, respectively.

One will appreciate that malicious behavior detection/prevention techniques can be used in other types of fraud detection systems using different types of entries. For example, a fraud detection system for payment processors (e.g., credit card processors) can be similarly created. Governments can employ a fraud detection system with the malicious behavior detection/prevention technique to look for anomalous payments from government entitlement programs (e.g., Medicare) or anomalous tax deductions.

Figure 8:
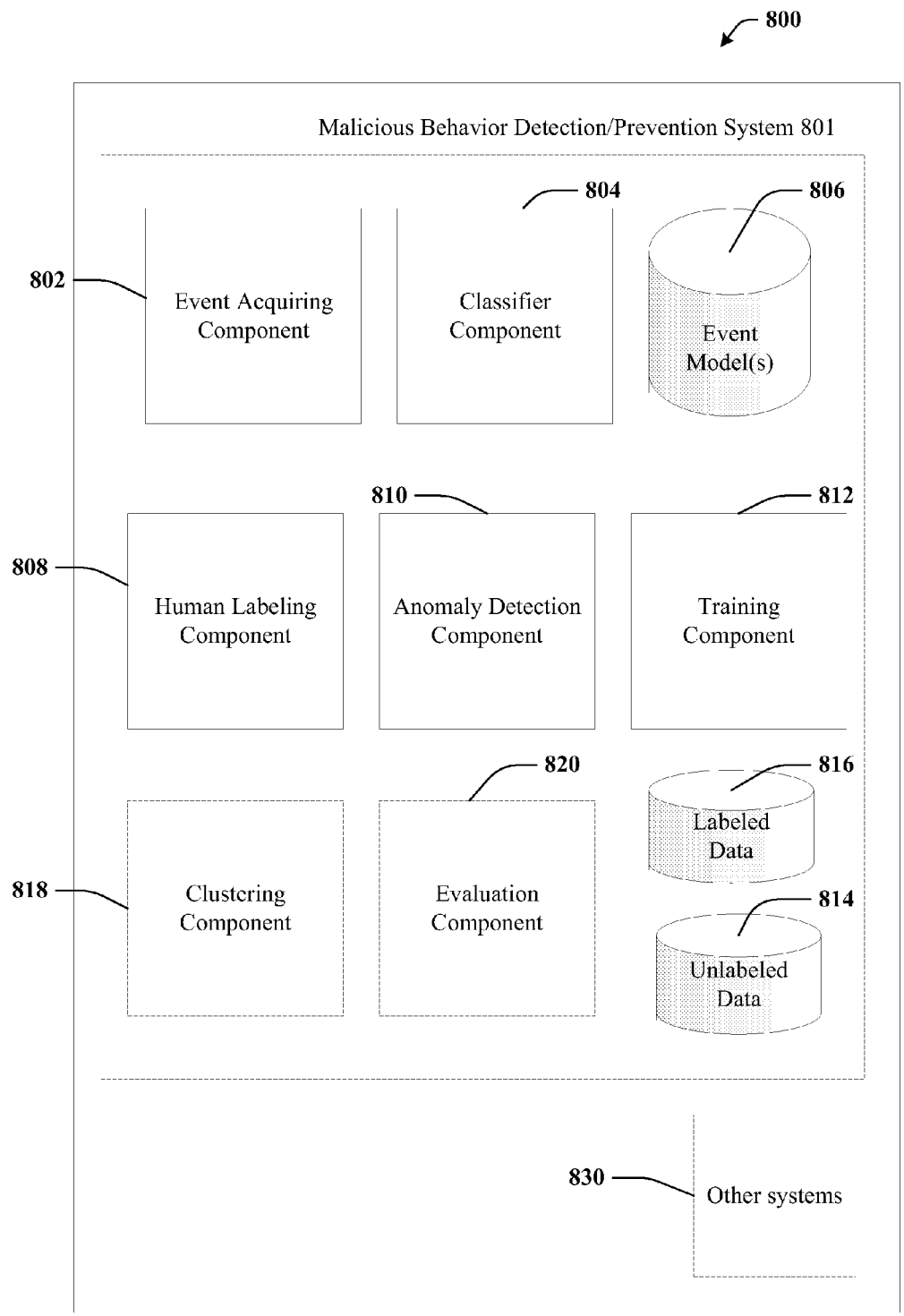
FIG. 8 is a block diagram with exemplary components according to one embodiment.

FIG. 8 illustrates a malicious behavior detection/prevention system 801 according to one embodiment. In this illustrated embodiment, the malicious behavior detection/prevention system 801 is part of a larger system 800, such as an intrusion detection system or a fraud detection system. One will appreciate that the illustrated system can be effected over one or more computers.

The event acquiring component 802 receives an indication of multiple events. The events can be indicated in blocks or one or more events can be processed at a time (e.g., in substantially realtime). The events can be clustered together to form entries by the optional clustering component 818 or the events can be used entries in at least some embodiments. The unlabeled entries are stored as unlabeled data 814. The classifier component 804 automatically classifies at least some of the indicated entries into multiple event classes using one or more classifiers. The classifier component 804 can employ various types of classifiers, such as logistic regression classifiers. In addition, the classifier component 804 can calculate an uncertainty score. Once an event is classified, the labeled event is stored as labeled data 816. In one embodiment, the labeled data 816 can include both automatically classified events as well as human classified events as well as various metadata associated with the entry, such as an anomaly score or an uncertainty score.

Each event class can have one or more event models 806. The event models can be, for example, Bayes classification models. An event model for an event class is utilized by the anomaly detection component 810 to detect potential anomalies within that class. As previously stated, the detection of these anomalies can be determined by calculating an anomaly score for each entry in a class based on how the entry fits the event model. Unusual entries in a class are assumed to be anomalies. The human labeling component 808 selects entries for human labeling and indicates at least some selected entries to a human analyst for classification. The human then inputs an indication of an event class, such as by selecting the class from a graphical user interface. Events indicated to the human can include potential anomalies or ambiguously classified events. As a result of the human's manual classification, the training component 812 trains the classifier from the classifier component 804 using one or more events that are classified by the human analyst.

During the evaluation phase, the event acquiring component 802 receives one or more events. If the events were clustered in the training phase, the events are clustered by the optional clustering component 818 to perform the same clustering performed during the training phase. The evaluation component 820 utilizes the trained classifier from the classifier component 804 to classify the entry and then applies an associated policy for the class of the entry.

As previously discussed, other systems 830 can interact with the malicious behavior detection/prevention system 801 depending on the usage scenario. Other systems can include external data sources, such as external databases or recorded video. The other systems can also implement the rest of a larger system, such as an intrusion detection system or a fraud detection system.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, may be provided to communicatively couple to such sub-components in order to provide integrated functionality. Any components described herein can also interact with one or more other additional components. For example, an additional component can implement housekeeping tasks, such as backing up the event models and labeled data or allowing the migration of this data to other computer systems.

Figure 9:
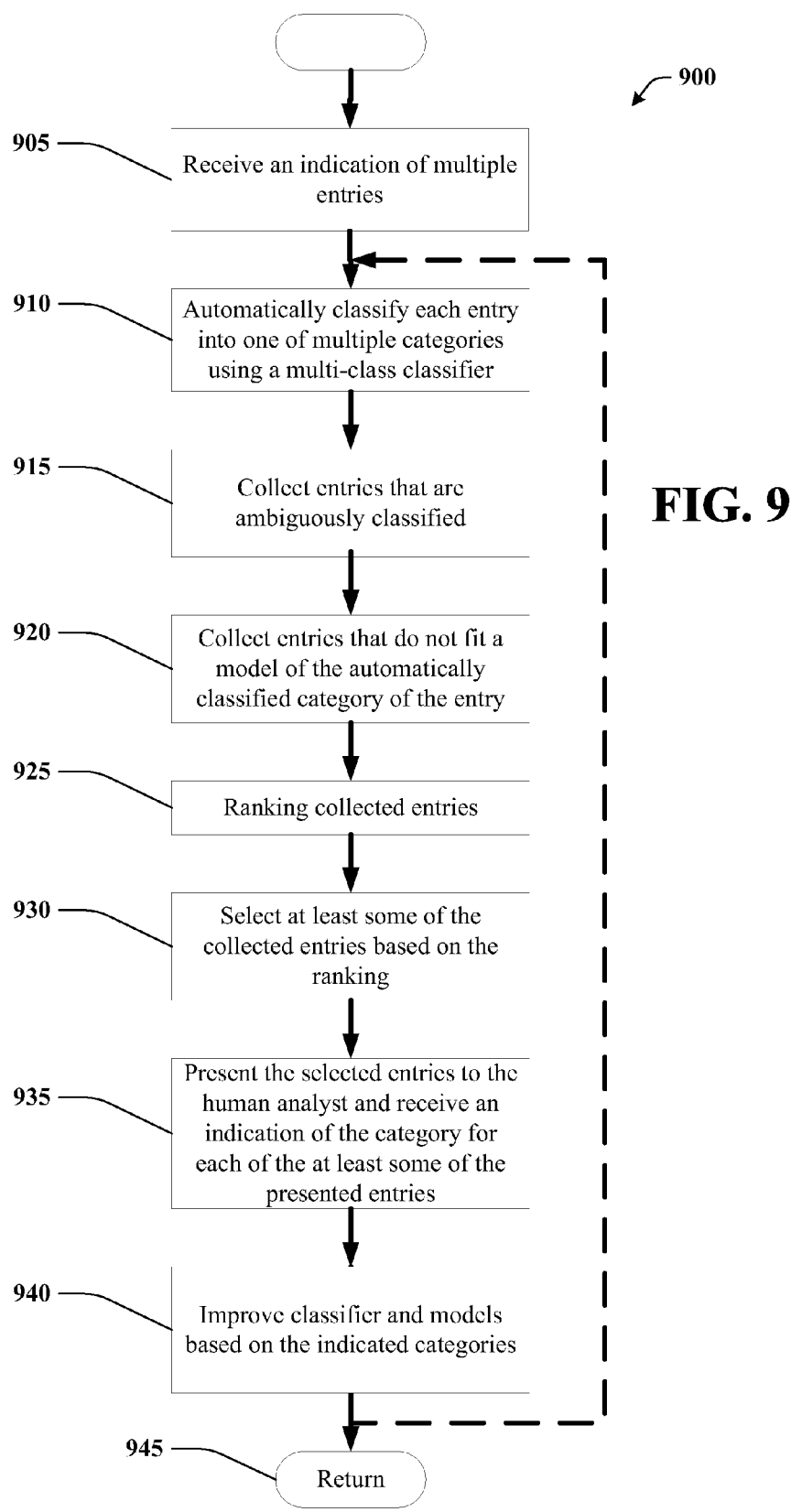
FIG. 9 is a flowchart of malicious behavior detection/prevention method according to one embodiment.
Figure 10:
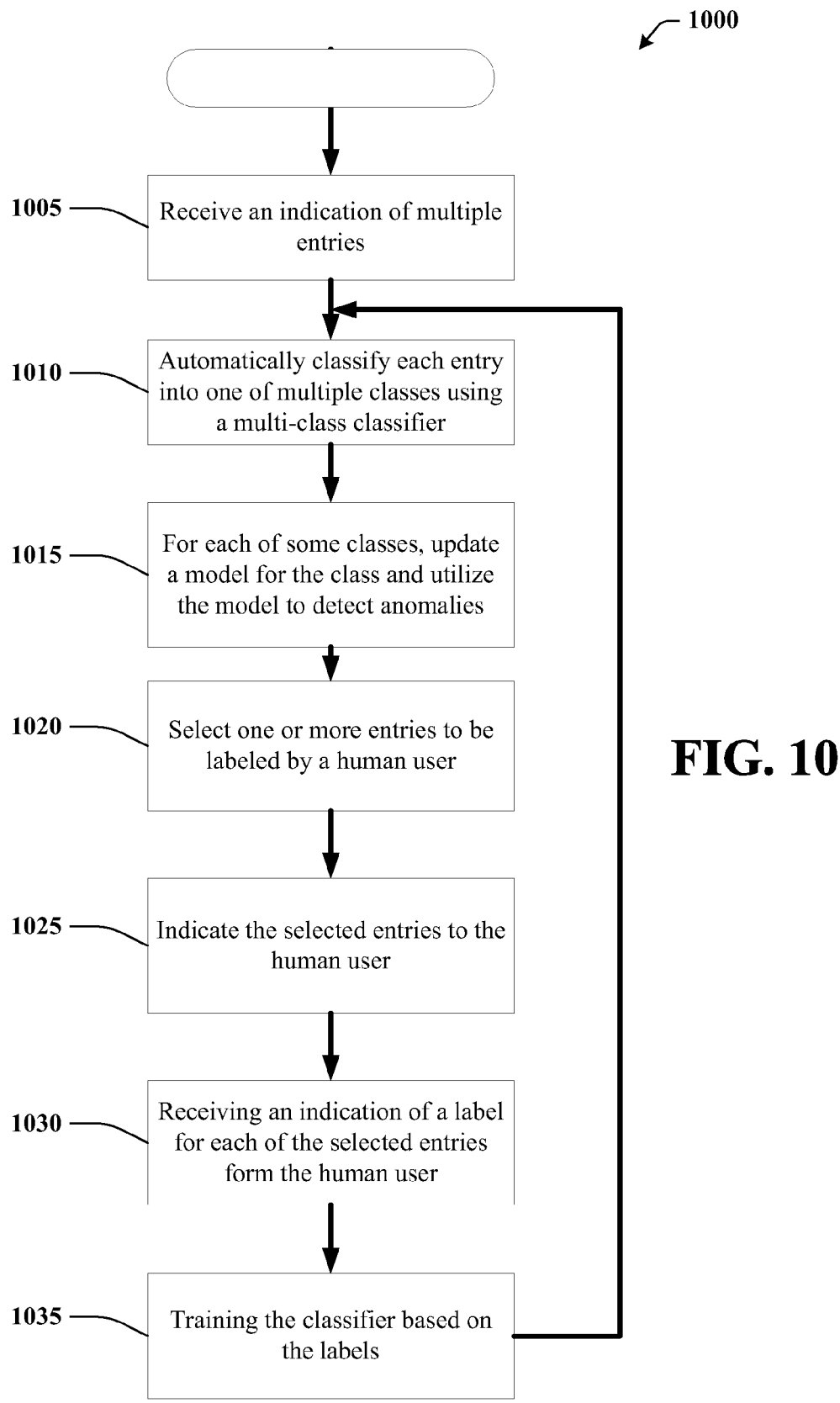
FIG. 10 is a flowchart of malicious behavior detection/prevention method according to another embodiment.
Figure 11:
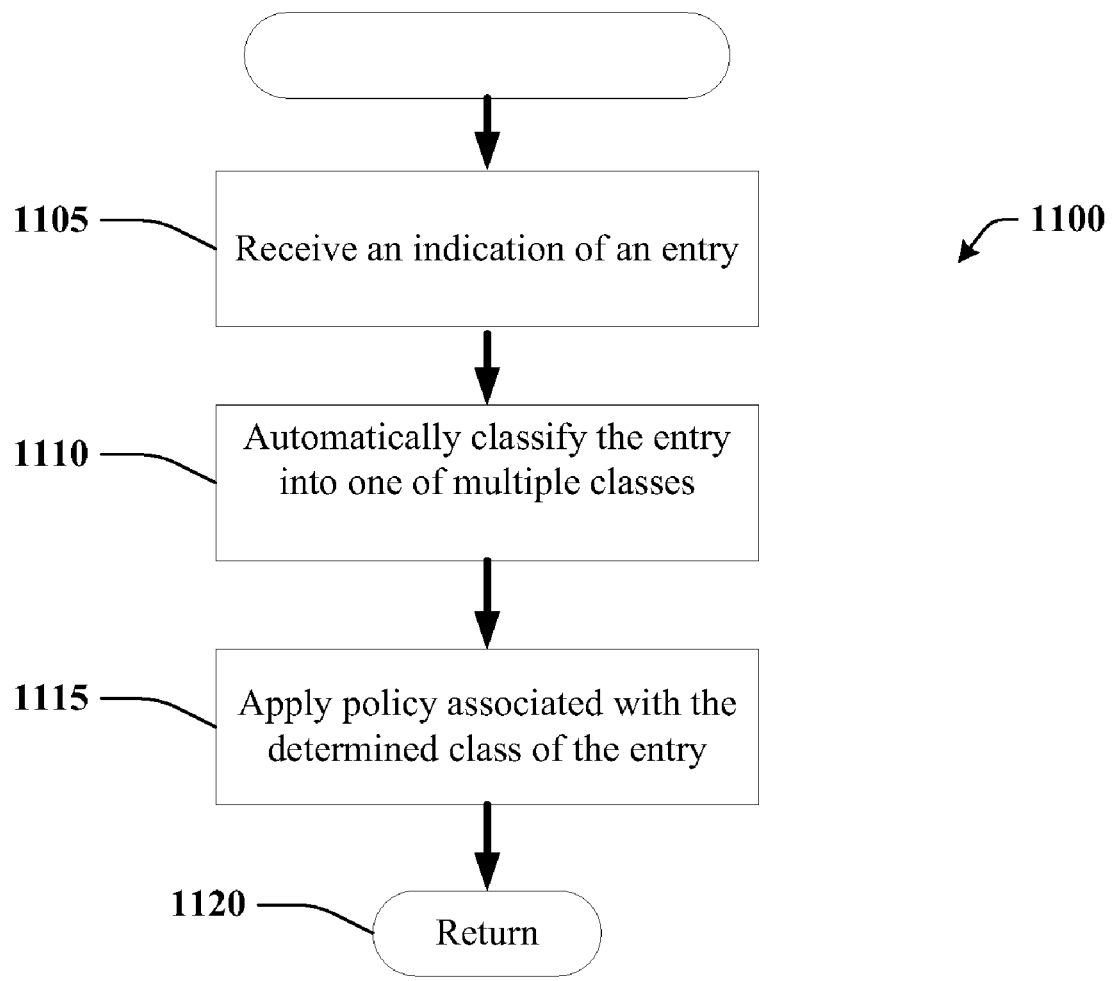
FIG. 11 is a flowchart of a method during the evaluation phase of the malicious behavior detection/prevention system according to one embodiment.

In view of the exemplary systems described supra, methodologies that can be implemented in accordance with the disclosed subject matter will be better appreciated with reference to the flowcharts of FIGS. 9, 10, and 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks can be required to implement the methodologies described hereinafter.

FIG. 9 illustrates a malicious behavior detection/prevention methodology 900 according to one embodiment. At 905, an indication of multiple entries is received. The indication can be received from other systems in real-time or can be received by querying logs of other systems. At 910, the entries are automatically classified into one of multiple categories using a multi-class classifier. At 915, entries are collected that are ambiguously classified. At 920, entries are collected that do not fit a model of the automatically classified category of the entry. At 925, the collected entries are ranked according to at least one of an anomaly score or an uncertainty score. At 930, at least some of the collected entries are selected based on the ranking. At 935, the selected entries are presented to a human analyst and an indication of the category for each of at least some of the presented entries is received. At 940, the classifier and the one or more models are improved based on the indicated categories. In at least some embodiments, the method returns to 910 to reiterate over the same group of multiple entries again and thus continue to train the classifier. If additional iterations are not performed or multiple iterations have already been performed (e.g., a predetermined number of iterations have been performed), at 945, the method returns. One will appreciate that the method can be performed by a large entity that employs its own human analyst or a customer of an organization that supplies a trained classifier.

FIG. 10 illustrates a malicious behavior detection/prevention methodology 1000 according to another embodiment during the training phase. At 1005, an indication is received of multiple entries. At 1010, each entry is automatically classified into one or multiple classes using a classifier. In some embodiments, the classifier can be seeded with various types of entries before being employed initially by an organization, such as when a disparate organization supplies at least a partially trained classifier. At 1015, the model for each class is updated for one or more classes, such as updating only the models of classes that contain automatically classified entries from within the block being processed. In addition, during 1015, the model is utilized to detect one or more anomalies within some or all of the classes. The anomalies can be detected based on how well an entry fits the event model for its classified class. In at least some embodiments, an anomaly score expresses how well an entry fits the event model for its classified class. At 1020, entries are selected to be labeled by a human user. In one embodiment, a predetermined number of entries are selected (e.g., per class, in total). The percentage of anomalies and ambiguously classified entries can be predetermined, such as having about 50% of each type. For example, in one embodiment, one uncertain entry and one anomaly per class are selected. The selection of ambiguously classified entries, for example, can be based on a level of uncertainty in the classification. At 1025, selected entries are indicated to the human user. The human user labels the selected entries at 1030. Then, at 1035, the classifier is trained based on the labels. After 1035, another iteration can be performed to continue to train the classifier.

One will appreciate that since classification improves as more entries are labeled, previously classified entries can be used as one or more blocks of entries to further improve the accuracy of the system. One will also appreciate that additional processing can be performed. For example, problems (e.g., violations of company policy, computer down, etc.), such as all new entries in a class associated with abnormal behavior, can be presented to a human user for further investigation and processing or automatically corrects based on an associated policy.

FIG. 11 illustrates a method 1100 according to one embodiment during the evaluation phase. Although FIG. 11 illustrates evaluating a single entry, one skilled in the art will appreciate that the method can be performed for multiple entries. At 1105, an indication of an entry is received, such as in real-time from other systems. At 1110, the indicated entry is automatically classified into one of multiple classes using the trained classifier. At 1115, a policy is applied based on the determined class of the entry. As previously stated, the policy can be to do nothing, take corrective action, and/or alert appropriate people. Alerts can be sent in various manners, such as email or text messaging. After applying the policy the method returns at 1120.

Figure 12:
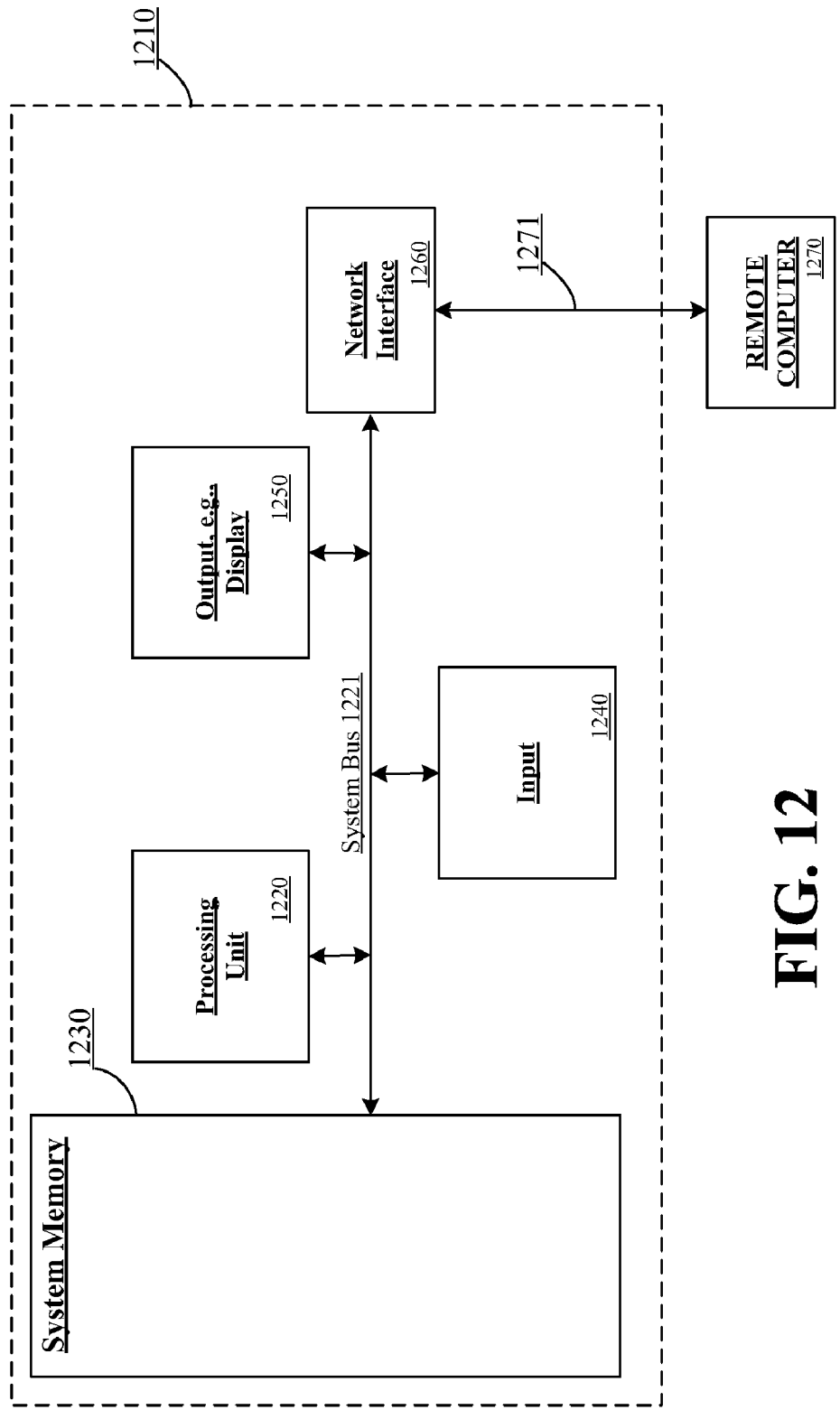
FIG. 12 is a block diagram representing an exemplary non-limiting computing system or operating environment in which the disclosed subject matter can be implemented.

The invention applies to any device wherein it may be desirable to detect malicious behavior. It should be understood, therefore, that handheld, portable and other computing devices and computing objects of all kinds are contemplated for use in connection with the disclosed subject matter, either to perform malicious behavior detection/prevention techniques in their entirety or to display entries for labeling by a human user. Accordingly, the below general purpose remote computer described below in FIG. 12 is but one example, and the present invention may be implemented with any client having network/bus interoperability and interaction. Thus, the disclosed subject matter can be implemented in an environment of networked hosted services in which very little or minimal client resources are implicated, e.g., a networked environment in which the client device serves merely as an interface to interact with the human user.

FIG. 12 thus illustrates an example of a suitable computing system environment 1200 in which the invention can be implemented, although as made clear above, the computing system environment 1200 is only one example of a suitable computing environment for a media device and is not intended to suggest any limitation as to the scope of use or functionality. Neither should the computing environment 1200 be interpreted as having any dependency or requirement relating to any one or combination of components illustrated in the exemplary operating environment 1200.

With reference to FIG. 12, an exemplary device for implementing the invention includes a general purpose computing device in the form of a computer 1210. Components of computer 1210 can include, but are not limited to, a processing unit 1220, a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules or other data in a modulated data signal such as a carrier wave or other transport mechanism and includes any information delivery media.

The system memory 1230 can include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, can be stored in memory 1230. Memory 1230 typically also contains data and/or program modules that are immediately accessible to and/or presently being operated on by processing unit 1220. By way of example, and not limitation, memory 1230 can also include an operating system, application programs, other program modules, and program data.

The computer 1210 can also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221 through a non-removable memory interface such as an interface, and a magnetic disk drive or optical disk drive is typically connected to the system bus 1221 by a removable memory interface, such as an interface.

A user can enter commands and information into the computer 1210 through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1220 through user input 1240 and associated interface(s) that are coupled to the system bus 1221, but can be connected by other interface and bus structures, such as a parallel port, game port or a universal serial bus (USB). A graphics subsystem can also be connected to the system bus 1221. A monitor or other type of display device is also connected to the system bus 1221 via an interface, such as output interface 1250, which can in turn communicate with video memory. In addition to a monitor, computers can also include other peripheral output devices such as speakers and a printer, which can be connected through output interface 1250.

The computer 1210 can operate in a networked or distributed environment using logical connections to one or more other remote computers, such as remote computer 1270, which can in turn have media capabilities different from device 1210. The remote computer 1270 can be a personal computer, a server, a router, a network PC, a peer device or other common network node, or any other remote media consumption or transmission device, and can include any or all of the elements described above relative to the computer 1210. The logical connections depicted in FIG. 12 include a network 1271, such local area network (LAN) or a wide area network (WAN), but can also include other networks/buses. Such networking environments are commonplace in homes, offices, enterprise-wide computer networks, intranets and the Internet.

When used in a LAN networking environment, the computer 1210 is connected to the LAN 1271 through a network interface or adapter. When used in a WAN networking environment, the computer 1210 typically includes a communications component, such as a modem, or other means for establishing communications over the WAN, such as the Internet. A communications component, such as a modem, which can be internal or external, can be connected to the system bus 1221 via the user input interface of input 1240, or other appropriate mechanism. In a networked environment, program modules depicted relative to the computer 1210, or portions thereof, can be stored in a remote memory storage device. It will be appreciated that the network connections shown and described are exemplary and other means of establishing a communications link between the computers can be used.

There are multiple ways of implementing the present invention, e.g., an appropriate API, control, standalone or downloadable software object, etc. which enables applications and services to use the systems and methods for malicious behavior detection/prevention.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts can be applied to any computing device or system in which it is desirable to quickly identify anomalies for further investigation by a human. For instance, the malicious behavior detection/prevention of the subject matter can be applied provided as a separate object on the device, as part of another object or system, as a distributed object, a combination of any of the foregoing, etc.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component can be localized on one computer and/or distributed between two or more computers.

Thus, the methods and apparatus of the subject disclosure, or certain aspects or portions thereof, can take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

One or more programs that may implement the malicious behavior detection/prevention of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention can be a combination of hardware and software.

Furthermore, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, in particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Additionally, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

While the disclosed subject matter has been described in connection with the preferred embodiments of the various figures, it is to be understood that other similar embodiments can be created or modifications and additions can be made to the described embodiment for performing the same function of the disclosed subject matter without deviating therefrom.

Still further, the present invention can be implemented in or across a plurality of processing chips or devices, and storage can similarly be effected across a plurality of devices. Therefore, the present invention should not be limited to any single embodiment, but rather should be construed in breadth and scope in accordance with the appended claims.

What is claimed is:

1. A method comprising:
under control of one or more processors configured with executable instructions:
automatically classifying each of multiple entries into one of multiple categories using a multi-class classifier, the multi-class classifier configured to allow a human analyst to control a number of entries presented for automatic classification;
collecting entries that are ambiguously classified;
collecting entries that do not fit a model of the automatically classified category of the entry;
ranking collected entries according to an anomaly score and an uncertainty score;
selecting at least some of the collected entries based on the ranking;
presenting at least some of the selected entries to a human analyst for labeling;
receiving an indication of a category from the human analyst for each of at least some of the presented entries; and
improving the multi-class classifier and one or more models based on the indicated labels.

2. The method of claim 1 wherein at least some of the entries correspond to multiple actions.

3. The method of claim 1, wherein:
an entry is ambiguously classified if an uncertainty score indicates a high level of uncertainty in the classification; and
the ranking is calculated in part according to:

$$\min_{i,j\neq i}|P(i\,|\,x_n) - P(j\,|\,x_n)|$$

$$\text{while } i = \arg\max_k\,(P(k\,|\,x_n)),$$

wherein $x_n$ is an input vector representing an item and i, j and k are classes.

4. The method of claim 1 wherein the method is performed multiple times.

5. The method of claim 1 further comprising distributing the improved classifier to a disparate organization.

6. The method of claim 1 wherein an entry corresponds to multiple events occurring within a predetermined time window.

7. The method of claim 1 further comprising:
automatically classifying an entry into one of multiple categories using the improved multi-class classifier; and
applying an associated policy based on the automatically classified category of the entry.

8. The method of claim 1 wherein an entry corresponds with at least one of multiple network actions, multiple actions associated with accessing a data store, multiple financial transactions, and multiple actions associated with accessing a physical location.

9. One or more computer-readable media storing computer-executable instructions that, when executed, cause one or more processors to perform acts comprising:
storing, in a memory communicatively coupled to a processor, computer-executable instructions;
executing the instructions on the processor;
according to the instructions being executed:
automatically classifying each of multiple entries into one of multiple categories using a multi-class classifier;
collecting entries that are ambiguously classified;
collecting entries that do not fit a model of the automatically classified category of the entry;
ranking collected entries;
selecting at least some of the collected entries based on the ranking, and based on a predetermined number of anomalous entries and a predetermined number of ambiguous entries;

presenting at least some of the selected entries to a human analyst for labeling;
receiving an indication of a category from the human analyst for each of at least some of the presented entries; and
improving the multi-class classifier and one or more models based on the indicated labels.

10. The one or more computer-readable media of claim 9 wherein at least some of the entries correspond to multiple actions.

11. The one or more computer-readable media of claim 9 wherein the ranking is calculated in part according to:

$$\min_{i,j\neq i}|P(i|x_n) - P(j|x_n)|$$
$$\text{while } i = \arg\max_k (P(k|x_n))$$

wherein $x_n$ is an input vector representing an item and i, j and k are classes.

12. The one or more computer-readable media of claim 9 further comprising distributing the improved classifier to a disparate organization.

13. The one or more computer-readable media of claim 9 further comprising:
automatically classifying an entry into one of multiple categories using the improved multi-class classifier; and
applying an associated policy based on the automatically classified category of the entry.

14. The one or more computer-readable media of claim 9 wherein an entry corresponds with at least one of multiple network actions, multiple actions associated with accessing a data store, multiple financial transactions, and multiple actions associated with accessing a physical location.

15. A method comprising:
under control of one or more processors configured with executable instructions:
automatically classifying each of multiple entries into one of multiple categories using a multi-class classifier, the multi-class classifier configured to allow a human analyst to control a number of entries presented for automatic classification;
collecting entries that are ambiguously classified;
collecting entries that do not fit a model of the automatically classified category of the entry;
ranking collected entries according to at least one of an anomaly score and an uncertainty score;
selecting at least some of the collected entries based on the ranking and based on a predetermined number of anomalous entries and a predetermined number of ambiguous entries;
presenting at least some of the selected entries to the human analyst for labeling;
receiving an indication of a category from the human analyst for each of at least some of the presented entries; and
improving the multi-class classifier and one or more models based on the indicated labels.

16. The method of claim 15 wherein the ranking is based in part on:

$$\min_{i,j\neq i}|P(i|x_n) - P(j|x_n)|$$
$$\text{while } i = \arg\max_k (P(k|x_n)),$$

wherein $x_n$ is an input vector representing an item and i, j and k are classes.

17. The method of claim 15 wherein the method is performed multiple times.

18. The method of claim 15 further comprising distributing the improved classifier to a disparate organization.

19. The method of claim 15 further comprising:
automatically classifying an entry into one of multiple categories using the improved multi-class classifier; and
applying an associated policy based on the automatically classified category of the entry.

20. The method of claim 15 wherein an entry corresponds with at least one of multiple network actions, multiple actions associated with accessing a data store, multiple financial transactions, and multiple actions associated with accessing a physical location.

* * * * *